United States Patent
Boyd et al.

(10) Patent No.: US 7,299,266 B2
(45) Date of Patent: Nov. 20, 2007

(54) MEMORY MANAGEMENT OFFLOAD FOR RDMA ENABLED NETWORK ADAPTERS

(75) Inventors: William Todd Boyd, Poughkeepsie, NY (US); Douglas J. Joseph, Danbury, CT (US); Michael Anthony Ko, San Jose, CA (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 10/235,679

(22) Filed: Sep. 5, 2002

(65) Prior Publication Data

US 2004/0049600 A1    Mar. 11, 2004

(51) Int. Cl.
*G06F 15/173* (2006.01)

(52) U.S. Cl. .............. 709/213; 709/217; 709/223; 711/100; 711/113

(58) Field of Classification Search ........... 711/159, 711/173, 202, 100, 113; 709/223, 224, 214, 709/215, 213, 217; 718/105
See application file for complete search history.

(56) References Cited

U.S. PATENT DOCUMENTS

| | | | | |
|---|---|---|---|---|
| 5,920,881 A | * | 7/1999 | Porterfield | 711/2 |
| 6,034,963 A | | 3/2000 | Minami et al. | 370/401 |
| 6,321,276 B1 | * | 11/2001 | Forin | 710/3 |
| 6,578,122 B2 | * | 6/2003 | Beukema et al. | 711/163 |
| 6,834,332 B2 | * | 12/2004 | Craddock et al. | 711/159 |
| 2002/0078271 A1 | * | 6/2002 | Berry | 710/36 |
| 2002/0091844 A1 | | 7/2002 | Craft et al. | |
| 2002/0107962 A1 | * | 8/2002 | Richter et al. | 709/225 |
| 2002/0172195 A1 | * | 11/2002 | Pekkala et al. | 370/360 |
| 2003/0005039 A1 | * | 1/2003 | Craddock et al. | 709/203 |
| 2003/0014544 A1 | * | 1/2003 | Pettey | 709/249 |
| 2003/0058870 A1 | | 3/2003 | Mizrachi et al. | |
| 2003/0084209 A1 | * | 5/2003 | Chadalapaka | 710/5 |
| 2003/0145045 A1 | * | 7/2003 | Pellegrino et al. | 709/203 |
| 2003/0158906 A1 | * | 8/2003 | Hayes | 709/211 |
| 2004/0034725 A1 | * | 2/2004 | Elzur | 710/22 |
| 2004/0037299 A1 | | 2/2004 | Pandya | |
| 2004/0093411 A1 | * | 5/2004 | Elzur et al. | 709/224 |
| 2004/0139237 A1 | * | 7/2004 | Rangan et al. | 710/1 |

FOREIGN PATENT DOCUMENTS

WO    WO 01/92998 A2    12/2001

OTHER PUBLICATIONS

Boyd et al., ISCSI Driver to Adapter Interface Protocol, no date.

* cited by examiner

*Primary Examiner*—Saleh Najjar
*Assistant Examiner*—Thuong (Tina) T Nguyen
(74) *Attorney, Agent, or Firm*—Duke W. Yee; Casimer K. Salys; Theodore D. Fay, III

(57) ABSTRACT

A method, computer program product, and distributed data processing system for memory management. Memory regions are registered and have access rights and Protection domains associated with them in response to receiving a request for a memory operation including a virtual address, which is used to address into a data structure. A second data structure is then used to translate the virtual address into physical addresses for the operation. A third data structure is used to allow an incoming request responsive to a remote operation being initiated.

24 Claims, 18 Drawing Sheets

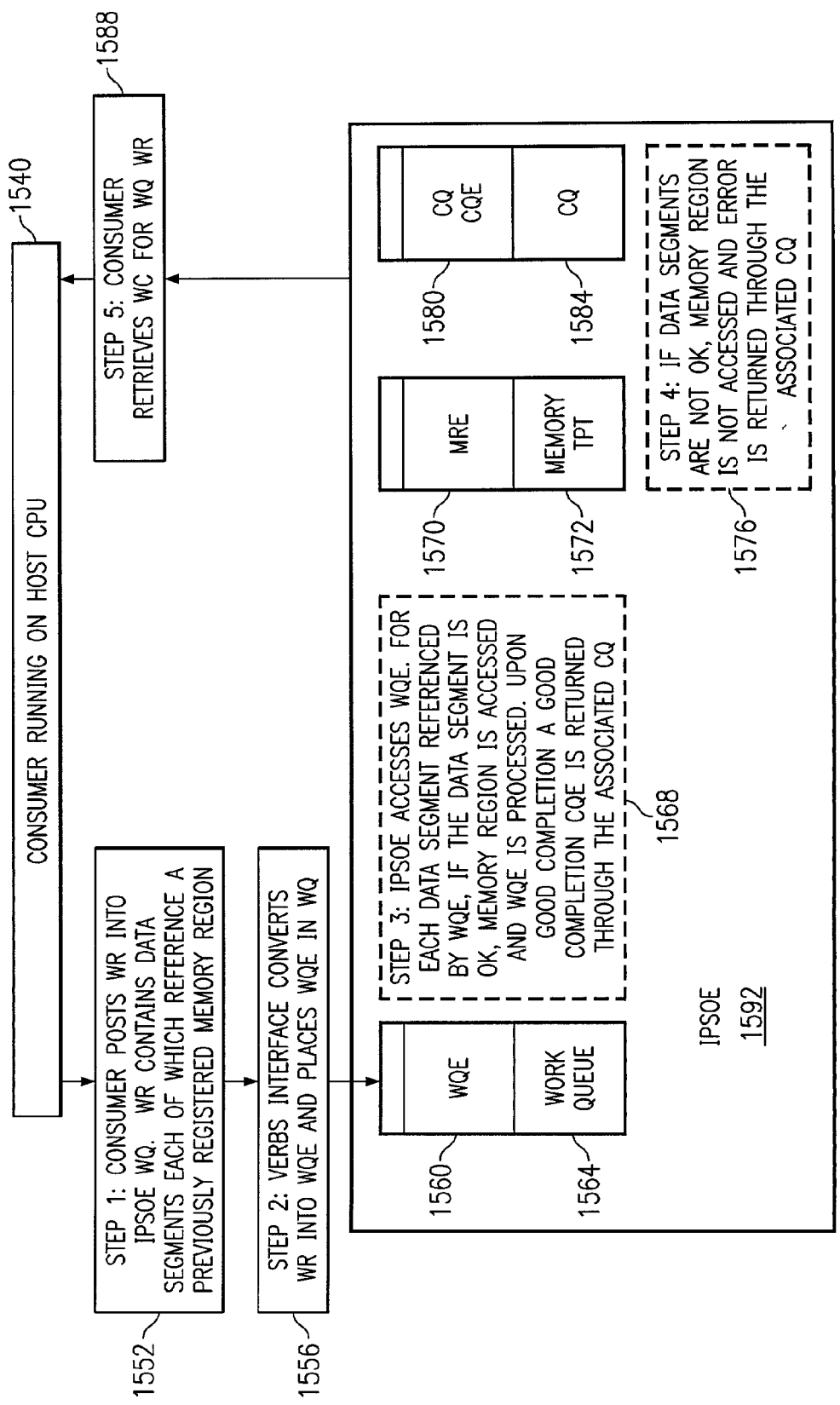

RDMA READ REQUEST FLOWCHART
1800

STEP 1: IF THE INCOMING DDP SEGMENT'S HEADER REFERENCES AN UNTAGGED BUFFER WITH BUFFER NUMBER 2, THEN THE INCOMING DDP HEADER'S MESSAGE SEQUENCE NUMBER (MSN) IS USED TO INDEX INTO THE RDMA READ RESOURCE QUEUE. CONTINUE TO STEP 2

1804

STEP 2: IF AN ENTRY IS AVAILABLE AT THE INDEX REFERENCED BY THE MSN, THEN THE DDP SEGMENT'S PAYLOAD IS STORED IN THE RDMA READ RESOURCE QUEUE ENTRY AND CONTINUE TO STEP 3. OTHERWISE THE RDMA STREAM TERMINATION PROCESS IS INVOKED BY THE IPSOE

STEP 3: THE Tag_Index PORTION OF THE INCOMING RDMA READ REQUEST HEADER'S SOURCE STag IS USED TO VALIDATE THE INCOMING RDMA READ REQUEST. CONTINUE TO STEP 4

1808

STEP 4: IF INCOMING RDMA READ REQUEST PASSES ALL THE CHECKS, THE IPSOE CREATES THE RDMA READ RESPONSES BY READING THE MEMORY WINDOW REFERENCED BY THE RDMA READ REQUEST AND ISSUING THE RDMA READ RESPONSES. OTHERWISE A TERMINATE MESSAGE IS GENERATED DESCRIBING THE CAUSE OF THE ERROR

RDMA READ RESPONSE AND RDMA WRITE FLOWCHART
1814

1816

STEP A: IF THE INCOMING DDP SEGMENT'S HEADER REFERENCES A TAGGED BUFFER, THEN THE Tag_Index PORTION OF THE INCOMING DDP HEADER'S STag IS USED TO VALIDATE THE INCOMING DDP SEGMENT. CONTINUE TO STEP B

STEP B: THE INCOMING DDP HEADER IS CHECKED TO SEE IF IT PASSES ALL THE MEMORY MANAGEMENT CHECKS. IF IT DOES, PROCESSING CONTINUES TO STEP C. OTHERWISE A TERMINATE MESSAGE IS GENERATED DESCRIBING THE CAUSE OF THE ERROR

1820

1824

STEP C: THE FOLLOWING FIELDS ARE CHECKED: THE DDP STANDARD'S LAST BIT IN THE INCOMING DDP HEADER (IF SET IT INDICATES THE INCOMING DDP SEGMENT IS THE LAST DDP SEGMENT OF A RDMA MESSAGE); THE ONE TOUCH ENABLED BIT STORED IN THE MEMORY TPT ENTRY REFERENCED BY THE STag; THE TOUCHED BIT STORED IN THE MEMORY TPT ENTRY REFERENCED BY THE STag; STORED DDP (BYTE STREAM) SEQUENCE NUMBER STORED IN THE MEMORY TPT ENTRY REFERENCED BY THE STag; THE UNDERLYING TCP BYTE SEQUENCE NUMBER; AND THE LAST BYTE OF THE INCOMING DDP SEGMENT'S (BYTE STREAM) SEQUENCE NUMBER. TABLE D, CAPTURES THE ACTIONS TAKEN FOR THE VARIOUS CASES:

FROM FIG. 18A

1828 STEP D: TABLE D

| LAST BIT | ONE TOUCH ENABLED | TOUCHED | DDP SN AND TCP SN | ACTION |
|---|---|---|---|---|
| NOT SET | | | | PLACE INCOMING DDP SEGMENT PLAYLOAD |
| SET | NOT SET | | | PLACE INCOMING DDP SEGMENT'S PAYLOAD |
| SET | SET | SET | | INVALIDATE ENTRY, TERMINATE |
| SET | SET | NOT SET | INCOMING DDP SN=TCP SN | INVALIDATE ENTRY, PLACE INCOMING DDP SEGMENT |
| SET | SET | NOT SET | INCOMING DDP SN WITHIN TCP SN | SET TOUCHED BIT, THE INCOMING DDP SN IS STORED IN MEMORY TPT ENTRY'S DDP SN FIELD, AND THE INCOMING DDP SEGMENT'S PAYLOAD IS PLACED |
| SET | SET | NOT SET | INCOMING DDP SN OUTSIDE TCP SN | DROP THE INCOMING DDP SEGMENT |

*FIG. 18B*

1814
RDMA READ RESPONSE
AND RDMA WRITE FLOWCHART

MEMORY MANAGEMENT OFFLOAD FOR RDMA ENABLED NETWORK ADAPTERS

CROSS REFERENCE TO RELATED APPLICATIONS

The present invention is related to an application entitled iSCSI DRIVER TO ADAPTER INTERFACE PROTOCOL, Ser. no. 10/235,686, filed Sep. 5, 2002, assigned to the same assignee, and incorporated herein by reference.

BACKGROUND OF THE INVENTION

1. Technical Field

The present invention relates generally to communication protocols between a host computer and an input/output (I/O) device. More specifically, the present invention provides a method for memory management in the context of communication between a host and I/O device.

2. Description of Related Art

In an Internet Protocol (IP) Network, the software provides a message passing mechanism that can be used to communicate with input/output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through upper level protocols, such as Sockets, iSCSI, and Direct Access File System (DAFS).

Unfortunately, the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol. 4, No. 6, pp. 817-828, December 1996; and D. D. Clark, V. Jacobson, J. Romkey, H. Salwen, "An analysis of TCP processing overhead", IEEE Communications Magazine, Vol. 27, Issue 6, June 1989, pp 23-29). In the future the network stack will continue to consume excessive resources for several reasons, including: increased use of networking by applications; use of network security protocols; and the underlying fabric bandwidths are increasing at a higher rate than microprocessor and memory bandwidths. To address this problem the industry is offloading the network stack processing to an IP Suite Offload Engine (IPSOE).

There are two offload approaches being taken in the industry. The first approach uses the existing TCP/IP network stack, without adding any additional protocols. This approach can offload TCP/IP to hardware, but unfortunately does not remove the need for receive side copies. As noted in the papers above, copies are one of the largest contributors to central processing unit (CPU) utilization. To remove the need for copies, the industry is pursuing the second approach that consists of adding Framing, Direct Data Placement (DDP), and Remote Direct Memory Access (RDMA) over the TCP and the latter two over SCTP. The IP Suite Offload Engine (IPSOE) required to support these two approaches is similar, the key difference being that in the second approach the hardware must support the additional protocols.

The IPSOE provides a message passing mechanism that can be used by sockets, iSCSI, and DAFS to communicate between nodes. Processes executing on host computers, or devices, access the IP network by posting send/receive messages to send/receive work queues on an IPSOE. These processes also are referred to as "consumers".

The send/receive work queues (WQ) are assigned to a consumer as a queue pair (QP). The messages can be sent over three different transport types: traditional TCP, RDMA TCP, UDP, or SCTP. Consumers retrieve the results of these messages from a completion queue (CQ) through IPSOE send and receive work completion (WC) queues. The source IPSOE takes care of segmenting outbound messages and sending them to the destination. The destination IPSOE takes care of reassembling inbound messages and placing the inbound messages in the memory space designated by the destination's consumer. These consumers use IPSOE verbs to access the functions supported by the IPSOE. The software that interprets verbs and directly accesses the IPSOE is known as the IPSO interface (IPSOI).

Today the host CPU performs most IP suite processing. IP Suite Offload Engines offer a higher performance interface for communicating to other general purpose computers and I/O devices. Data sends or receives through the IPSOE require that the CPU either copy data from one memory location to another or register the memory so that the IPSOE can directly access the memory region. Each of these options requires significant CPU resources with the memory registration option being preferred for large memory transfers, however, as network speeds increase the amount of CPU resources required will increase. It would be advantageous to have an improved method, apparatus, and computer instructions for reducing the amount of CPU resources required to register these memory locations, expose them to remote systems through memory windows, and then provide one touch access as an option on the exposed memory windows. It would also be advantageous to have the mechanism apply for iSCSI 1.0, RDMA, and iSCSI-R.

SUMMARY OF THE INVENTION

The present invention provides a method, computer program product, and distributed data processing system for registering memory locations, exposing previously registered memory locations through memory windows, and then providing one touch access as an option on the exposed memory windows.

Specifically, the present invention is directed to memory regions that are written to and from by an Internet Protocol Suite Offload Engine (IPSOE) in accordance with a preferred embodiment of the present invention. A mechanism is provided for implicitly or explicitly registering memory regions and allowing hardware to directly use the region through memory region tables and address translation tables while keeping the region isolated from use by other applications. A method for accessing previously registered memory regions by incoming requests by utilizing a tag table to associate the request to with either a physical or virtual address. A mechanism for unbinding a previously bound window upon first use by an incoming message.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 15 is a flowchart and diagram representation of the process used by the IPSOE to validate memory accesses performed by Work Queue Elements posted by the Consumer as Work Request on an IPSOE Work Queue in accordance with a preferred embodiment of the present invention;

FIGS. 18A-18B are a flowchart and diagram eepresentation of the memory management process used to provide a one touch access mechanism with the deregistration function unexposed to the remote node and validate a remote RDMA read Request, RDMA Read Response, and RDMA Write Message in accordance with a preferred embodiment of the present invention.

DETAILED DESCRIPTION OF THE PREFERRED EMBODIMENT

The present invention provides a distributed computing system having endnodes, switches, routers, and links interconnecting these components. The endnodes can be Internet Protocol Suite Offload Engines or traditional host software based Internet protocol suites. Each endnode uses send and receive queue pairs to transmit and receive messages. The endnodes segment the message into frames and transmit the frames over the links. The switches and routers interconnect the endnodes and route the frames to the appropriate endnode. The endnodes reassemble the frames into a message at the destination.

Figure 1:
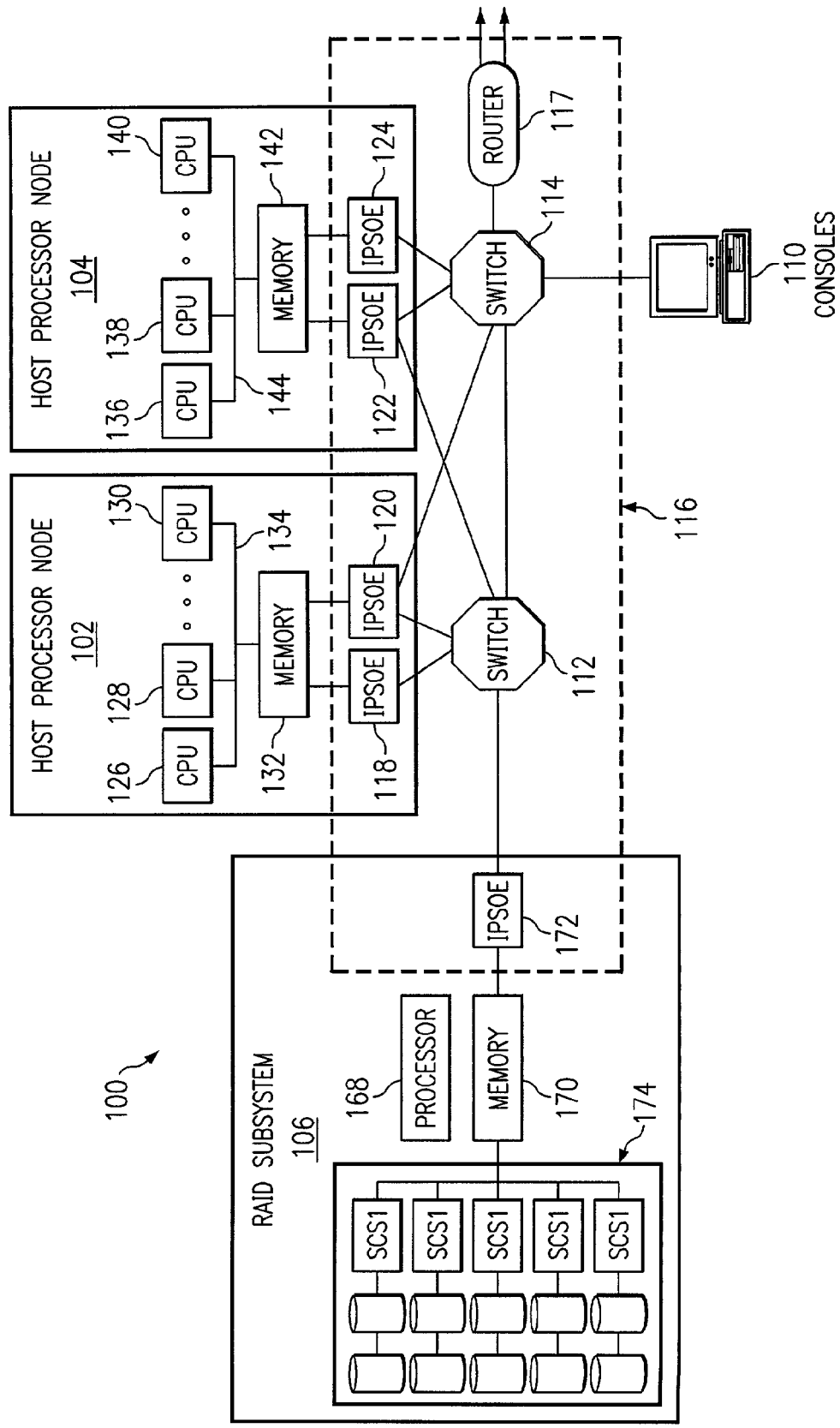
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of an Internet protocol network (IP net), such as IP net 100 and is provided merely for illustrative purposes and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

IP net 100 is a high-bandwidth, low-latency network interconnecting nodes within the distributed computer system. A node is any component attached to one or more links of a network and forming the origin and/or destination of messages within the network. In the depicted example, IP net 100 includes nodes in the form of host processor node 102, host processor node 104, and redundant array independent disk (RAID) subsystem node 106. The nodes illustrated in FIG. 1 are for illustrative purposes only, as IP net 100 can connect any number and any type of independent processor nodes, storage nodes, and special purpose processing nodes. Any one of the nodes can function as an endnode, which is herein defined to be a device that originates or finally consumes messages or frames in IP net 100.

In one embodiment of the present invention, an error handling mechanism in distributed computer systems is present in which the error handling mechanism allows for TCP or SCTP communication between endnodes in a distributed computing system, such as IP net 100.

A message, as used herein, is an application-defined unit of data exchange, which is a primitive unit of communication between cooperating processes. A frame is one unit of data encapsulated by Internet Protocol Suite headers and/or trailers. The headers generally provide control and routing information for directing the frame through IP net 100. The trailer generally contains control and cyclic redundancy check (CRC) data for ensuring frames are not delivered with corrupted contents.

Within a distributed computer system, IP net 100 contains the communications and management infrastructure supporting various forms of traffic, such as storage, interprocess communications (IPC), file access, and sockets. IP net 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the IP net fabric. The multiple ports and paths through the IP net shown in FIG. 1 can be employed for fault tolerance and increased bandwidth data transfers.

The IP net 100 in FIG. 1 includes switch 112, switch 114, and router 117. A switch is a device that connects multiple links together and allows routing of frames from one link to another link using the layer 2 destination address field. When the Ethernet is used as the link, the destination field is known as the media access control (MAC) address. A router is a device that routes frames based on the layer 3 destination address field. When Internet Protocol (IP) is used as the layer 3 protocol, the destination address field is an IP address.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types (TCP and SCTP), endnodes, such as host processor endnodes and I/O adapter endnodes, generate request frames and return acknowledgment frames. Switches and routers pass frames along, from the source to the destination.

In IP net 100 as illustrated in FIG. 1, host processor node 102, host processor node 104, and RAID subsystem node 106 include at least one IPSOE to interface to IP net 100. In one embodiment, each IPSOE is an endpoint that implements the IPSOI in sufficient detail to source or sink frames transmitted on IP net 100. Host processor node 102 contains IPSOEs in the form of host IPSOE 118 and IPSOE 120. Host processor node 104 contains IPSOE 122 and IPSOE 124. Host processor node 102 also includes central processing units 126-130 and a memory 132 interconnected by bus system 134. Host processor node 104 similarly includes central processing units 136-140 and a memory 142 interconnected by a bus system 144.

IPSOE 118 provides a connection to switch 112, while IPSOE 124 provides a connection to switch 114, and IP Suite Offload Engines 120 and 122 provide a connection to switches 112 and 114.

In one embodiment, an IP Suite Offload Engine is implemented in hardware or a combination of hardware and offload microprocessor(s). In this implementation, IP suite processing is offloaded to the IPSOE. This implementation also permits multiple concurrent communications over a switched network without the traditional overhead associated with communicating protocols. In one embodiment, the IPSOEs and IP net 100 in FIG. 1 provide the consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers.

In this example, RAID subsystem node 106 in FIG. 1 includes processor 168, memory 170, IP Suite Offload Engine (IPSOE) 172, and multiple redundant and/or striped storage disk unit 174.

IP net 100 handles data communications for storage, interprocessor communications, file accesses, and sockets. IP net 100 supports high-bandwidth, scalable, and extremely low latency communications. User clients can bypass the operating system kernel process and directly access network communication components, such as IPSOEs, which enable efficient message passing protocols. IP net 100 is suited to current computing models and is a building block for new forms of storage, cluster, and general networking communication. Further, IP net 100 in FIG. 1 allows storage nodes to communicate among themselves or communicate with any or all of the processor nodes in a distributed computer system. With storage attached to IP net 100, the storage node has substantially the same communication capability as any host processor node in IP net 100.

In one embodiment, the IP net 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for storage, cluster, and general networking communications. A typical storage operation employs a combination of channel and memory semantics. In an illustrative example storage operation of the distributed computer system shown in FIG. 1, a host processor node, such as host processor node 102, initiates a storage operation by using channel semantics to send a disk write command to the RAID subsystem IPSOE 172. The RAID subsystem examines the command and uses memory semantics to read the data buffer directly from the memory space of the host processor node. After the data buffer is read, the RAID subsystem employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
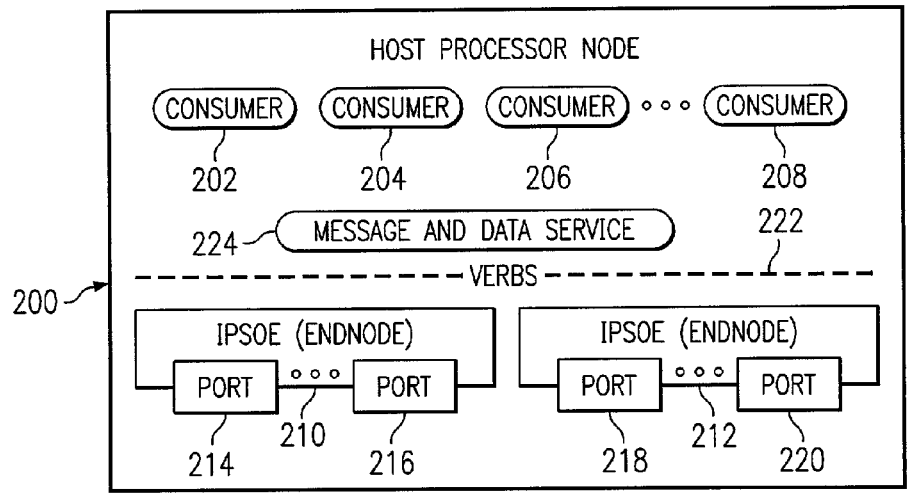
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202-208, which are processes executing on host processor node 200. Host processor node 200 also includes IP Suite Offload Engine (IPSOE) 210 and IPSOE 212. IPSOE 210 contains ports 214 and 216 while IPSOE 212 contains ports 218 and 220. Each port connects to a link. The ports can connect to one IP net subnet or multiple IP net subnets, such as IP net 100 in FIG. 1.

Consumers 202-208 transfer messages to the IP net via the verbs interface 222 and message and data service 224. A verbs interface is essentially an abstract description of the functionality of an IP Suite Offload Engine. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through IPSOE 210 and IPSOE 212. Message and data service 224 provides an interface to consumers 202-208 to process messages and other data.

Figure 3A:
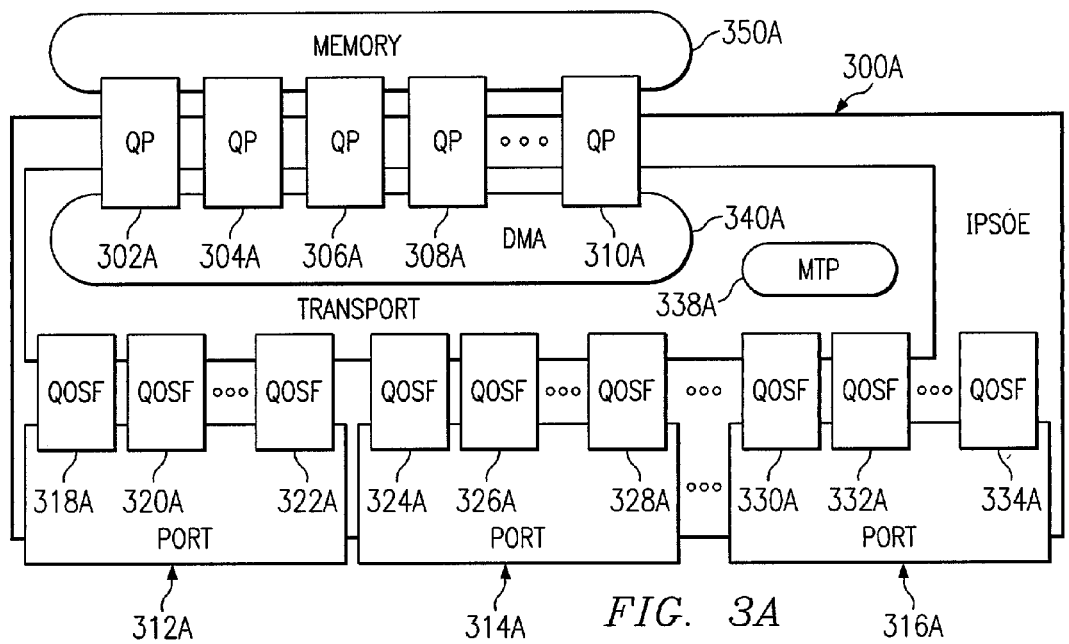
FIG. 3A is a diagram of an IP Suite Offload Engine in accordance with a preferred embodiment of the present invention.

With reference now to FIG. 3A, a diagram of an IP Suite Offload Engine is depicted in accordance with a preferred embodiment of the present invention. IP Suite Offload Engine 300A shown in FIG. 3A includes a set of queue pairs (QPs) 302A-310A, which are used to transfer messages to the IPSOE ports 312A-316A. Buffering of data to IPSOE ports 312A-316A is channeled using the network layer's quality of service field (QOSF), for example, the Traffic Class field in the IP Version 6 specification, 318A-334A. Each network layer quality of service field has its own flow control. Internet Engineering Task Force (IETF) standard network protocols are used to configure the link and network addresses of all IP Suite Offload Engine ports connected to the network. Two such protocols are Address Resolution Protocol (ARP) and Dynamic Host Configuration Protocol. Memory translation and protection (MTP) 338A is a mechanism that translates virtual addresses to physical addresses and validates access rights. Direct memory access (DMA) 340A provides for direct memory access operations using memory 350A with respect to queue pairs 302A-310A.

A single IP Suite Offload Engine, such as the IPSOE 300A shown in FIG. 3A, can support thousands of queue pairs. Each queue pair consists of a send work queue (SWQ) and a receive work queue (RWQ). The send work queue is used to send channel and memory semantic messages. The receive work queue receives channel semantic messages. A consumer calls an operating system specific programming interface, which is herein referred to as "verbs", to place work requests (WRs) onto a work queue.

Figure 3B:
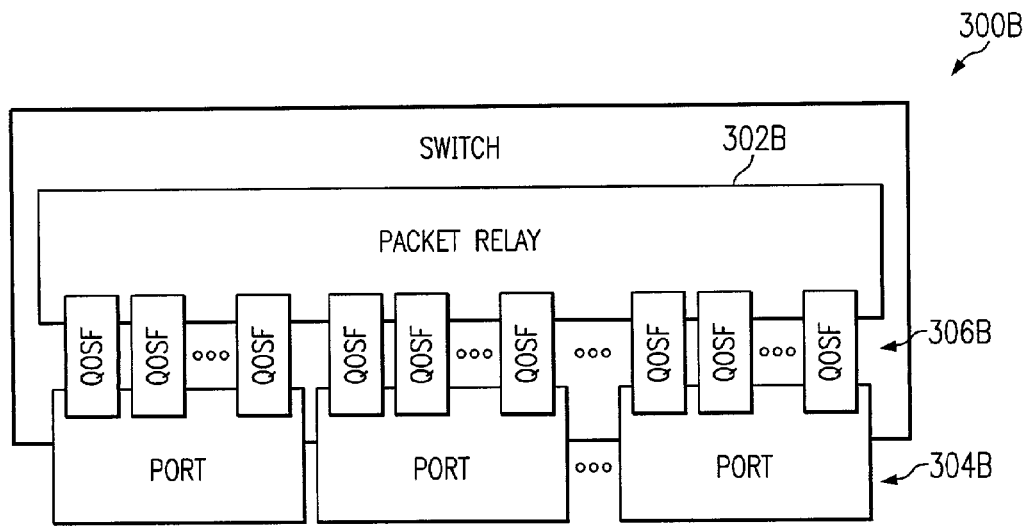
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through link or network layer quality of service fields such as IP version 4's Type of Service field 306B. Generally, a switch such as switch 300B can route frames from one port to any other port on the same switch.

Figure 3C:
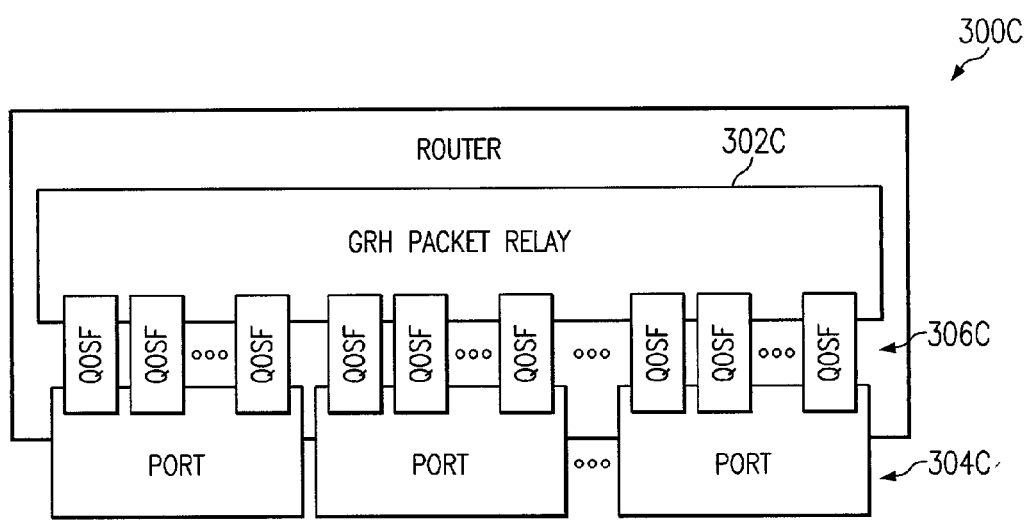
FIG. 3C is a diagram of a router in accordance with a preferred embodiment of the present invention.

Similarly, FIG. 3C depicts a router 300C according to a preferred embodiment of the present invention. Router 300C includes a frame relay 302C in communication with a number of ports 304C through network layer quality of service fields such as IP version 4's Type of Service field 306C. Like switch 300B, router 300C will generally be able to route frames from one port to any other port on the same router.

Figure 4:
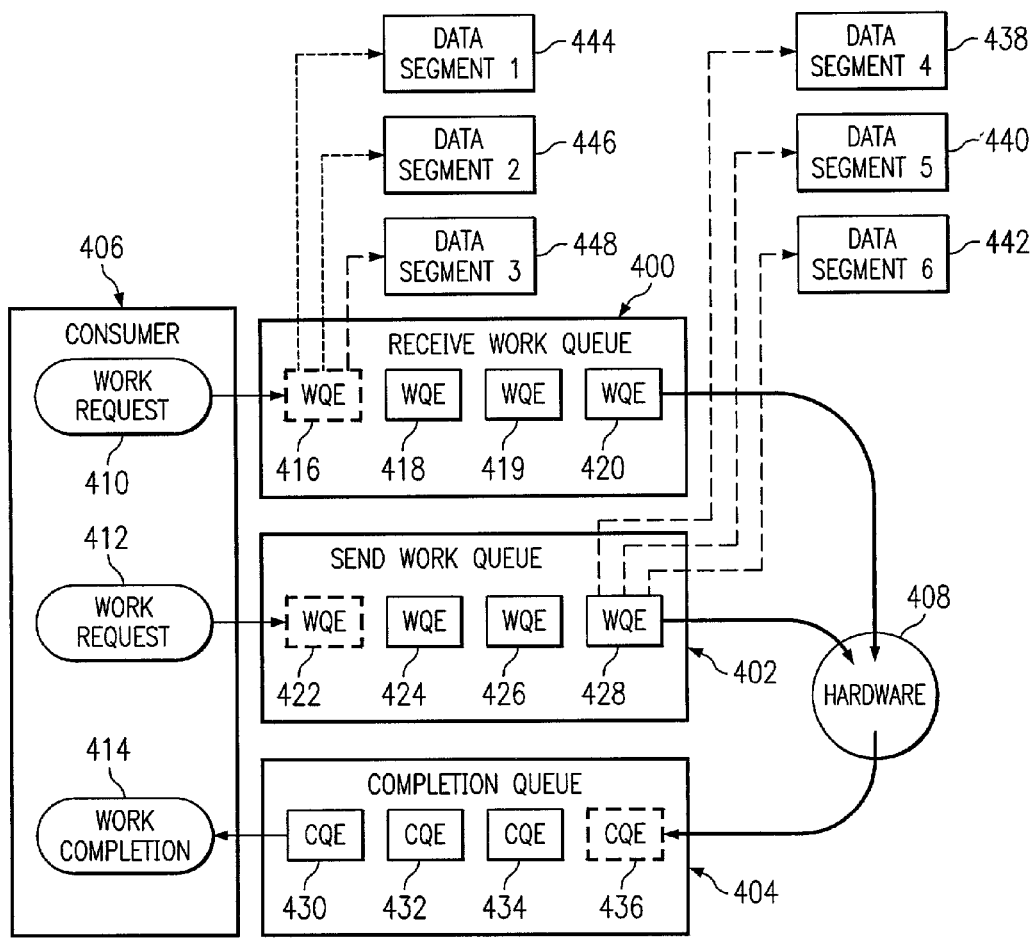
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422-428, describing data to be transmitted on the IP net fabric. Receive work queue 400 contains work queue elements (WQEs) 416-420, describing where to place incoming channel semantic data from the IP net fabric. A work queue element is processed by hardware 408 in the IPSOE.

The verbs also provide a mechanism for retrieving completed work from completion queue 404. As shown in FIG. 4, completion queue 404 contains completion queue elements (CQEs) 430-436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. The remote virtual addresses are in the address context of the process owning the remote queue pair targeted by the RDMA read work queue element.

A RDMA write work queue element provides a memory semantic operation to write a virtually contiguous memory space on a remote node. For example, work queue element 416 in receive work queue 400 references data segment 1 444, data segment 2 446, and data segment 3 448. The RDMA write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. The RDMA FetchOp is not included in current RDMA over IP standardization efforts, but is described here, because it may be used as a value-added feature in some implementations.

A bind (unbind) remote access key (STag) work queue element provides a command to the IP Suite Offload Engine hardware to modify (destroy) a memory window by associating (disassociating) the memory window to a memory region. The STag is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports three types of transport services: TCP, SCTP, and UDP.

TCP and SCTP associate a local queue pair with one and only one remote queue pair. TCP and SCTP require a process to create a queue pair for each process that TCP and SCTP are to communicate with over the IP net fabric. Thus, if each of N host processor nodes contains P processes, and all P processes on each node wish to communicate with all the processes on all the other nodes, each host processor node requires $P^2 \times (N-1)$ queue pairs. Moreover, a process can associate a queue pair to another queue pair on the same IPSOE.

Figure 5:
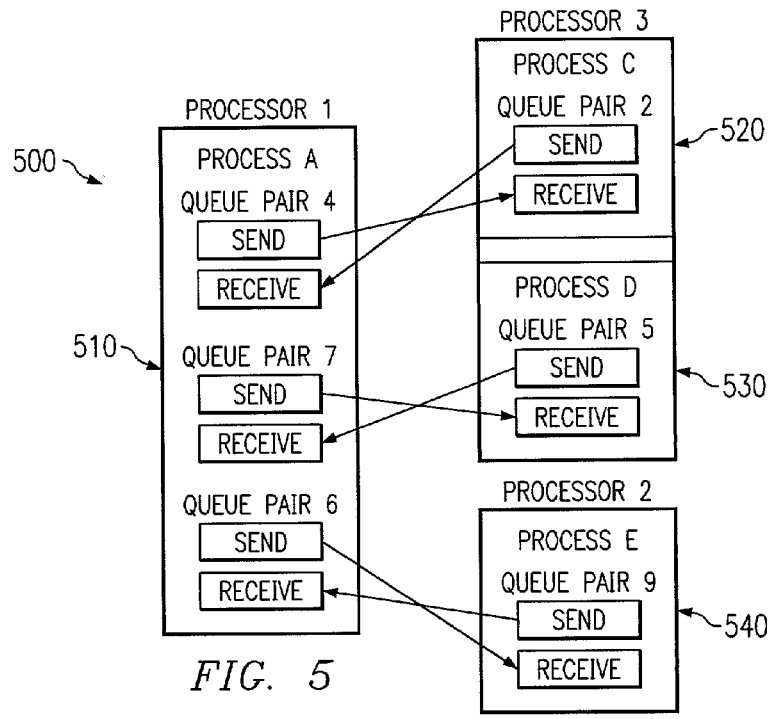
FIG. 5 is a diagram illustrating a portion of a distributed computer system in accordance with a preferred embodiment of the present invention in which a TCP or SCTP transport is used.

A portion of a distributed computer system employing TCP or SCTP to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The TCP or SCTP of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a TCP or SCTP causes data to be written into the receive memory space referenced by a receive WQE of the associated queue pair. RDMA operations operate on the address space of the associated queue pair.

In one embodiment of the present invention, the TCP or SCTP is made reliable because hardware maintains sequence numbers and acknowledges all frame transfers. A combination of hardware and IP net driver software retries any failed communications. The process client of the queue pair obtains reliable communications even in the presence of bit errors, receive underruns, and network congestion. If alternative paths exist in the IP net fabric, reliable communications can be maintained even in the presence of failures of fabric switches, links, or IP Suite Offload Engine ports.

In addition, acknowledgements may be employed to deliver data reliably across the IP net fabric. The acknowledgement may, or may not, be a process level acknowledgement, i.e. an acknowledgement that validates that a receiving process has consumed the data. Alternatively, the acknowledgement may be one that only indicates that the data has reached its destination.

The User Datagram Protocol is connectionless. The UDP is employed by management applications to discover and integrate new switches, routers, and endnodes into a given distributed computer system. The UDP does not provide the reliability guarantees of the TCP or SCTP. The UDP accordingly operates with less state information maintained at each endnode.

Figure 6:
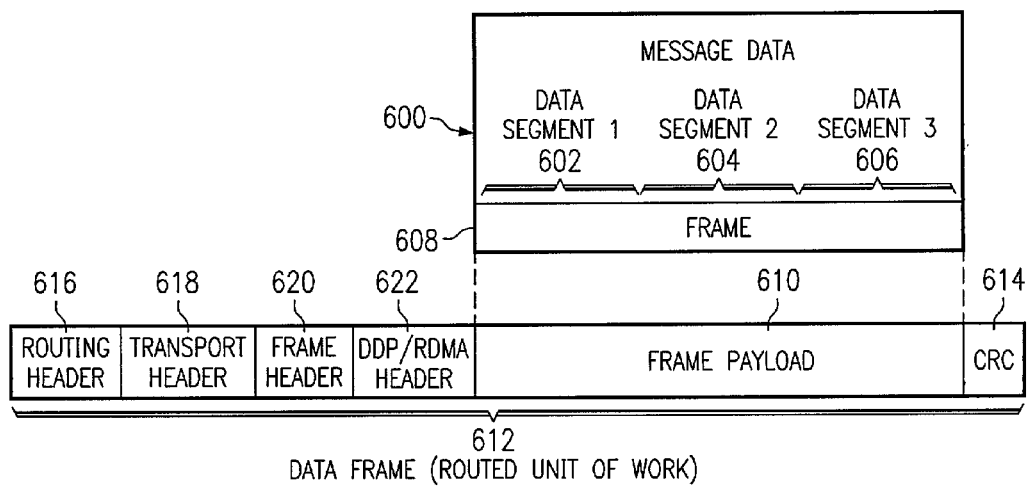
FIG. 6 is an illustration of a data frame in accordance with a preferred embodiment of the present invention.

Turning next to FIG. 6, an illustration of a data frame is depicted in accordance with a preferred embodiment of the present invention. A data frame is a unit of information that is routed through the IP net fabric. The data frame is an endnode-to-endnode construct, and is thus created and consumed by endnodes. For frames destined to an IPSOE, the data frames are neither generated nor consumed by the switches and routers in the IP net fabric. Instead for data frames that are destined to an IPSOE, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 600 contains data segment 1 602, data segment 2 604, and data segment 3 606, which are similar to the data segments illustrated in FIG. 4. In this example, these data segments form a frame 608, which is placed into frame payload 610 within data frame 612. Additionally, data frame 612 contains cyclic redundancy check (CRC) 614, which is used for error checking. Additionally, routing header 616 and transport header 618 are present in data frame 612. Routing header 616 is used to identify source and destination ports for data frame 612. Transport header 618 in this example specifies the sequence number and the source and destination port number for data frame 612. The sequence number is initialized when communication is established and incremented by 1 for each byte of frame header, DDP/RDMA header, data payload, and CRC. Frame header 620 in this example specifies the destination queue pair number associated with the frame and the length of the Direct Data Placement and/or Remote Direct Memory Access (DDP/RDMA) header plus data payload plus CRC. DDP/RDMA header 622 specifies the message identifier and the placement information for the data payload. The message identifier is constant for all frames that are part of a message. Example message identifiers include, for example, send, write RDMA, and read RDMA.

Figure 7:
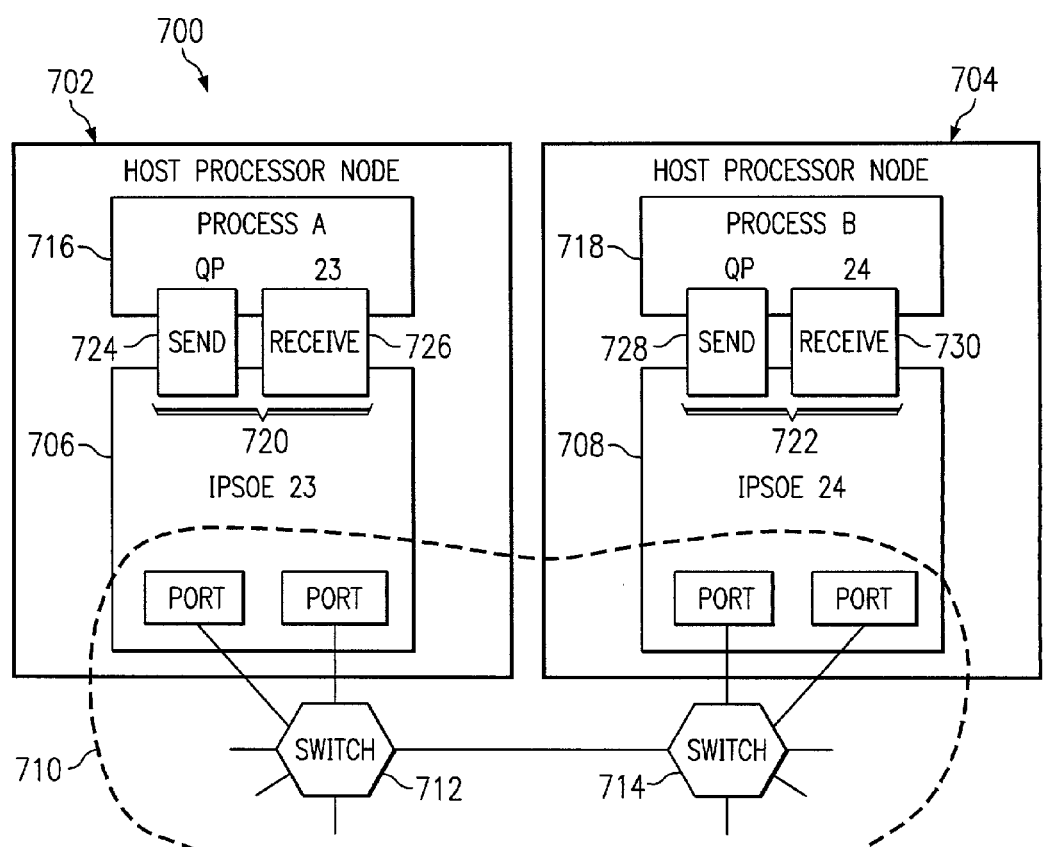
FIG. 7 is a diagram illustrating a portion of a distributed computer system in accordance with a preferred embodiment of the present invention.

In FIG. 7, a portion of a distributed computer system 700 is depicted to illustrate an example request and acknowledgment transaction. Distributed computer system 700 in FIG. 7 includes a host processor node 702 running process A 716 and a host processor node 704 running process B 718. Host processor node 702 includes an IPSOE 706. Host processor node 704 includes an IPSOE 708. The distributed computer system in FIG. 7 includes IP net fabric 710, which includes switch 712 and switch 714. The IP net fabric includes a link coupling IPSOE 706 to switch 712; a link coupling switch 712 to switch 714; and a link coupling IPSOE 708 to switch 714.

In the example transactions, host processor node 702 includes a client process A. Host processor node 704 includes a client process B. Client process A interacts with host IPSOE 706 through queue pair 23 720 comprising send queue 724 and receive queue 726. Client process B interacts with host IPSOE 708 through queue pair 24 722 comprising send queue 728 and receive queue 730. Queue pairs 23 and 24 are data structures that include a send work queue and a receive work queue.

Process A initiates a message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a part of the message, such as indicated by data segments 1, 2, and 3, which respectively hold message parts 1, 2, and 3, in FIG. 4.

Hardware in host IPSOE 706 reads the work queue element and segments the message stored in virtual contiguous buffers into data frames, such as the data frame illustrated in FIG. 6. Data frames are routed through the IP net fabric, and for reliable transfer services, are acknowledged by the final destination endnode. If not successfully acknowledged, the data frame is retransmitted by the source endnode. Data frames are generated by source endnodes and consumed by destination endnodes.

Figure 8:
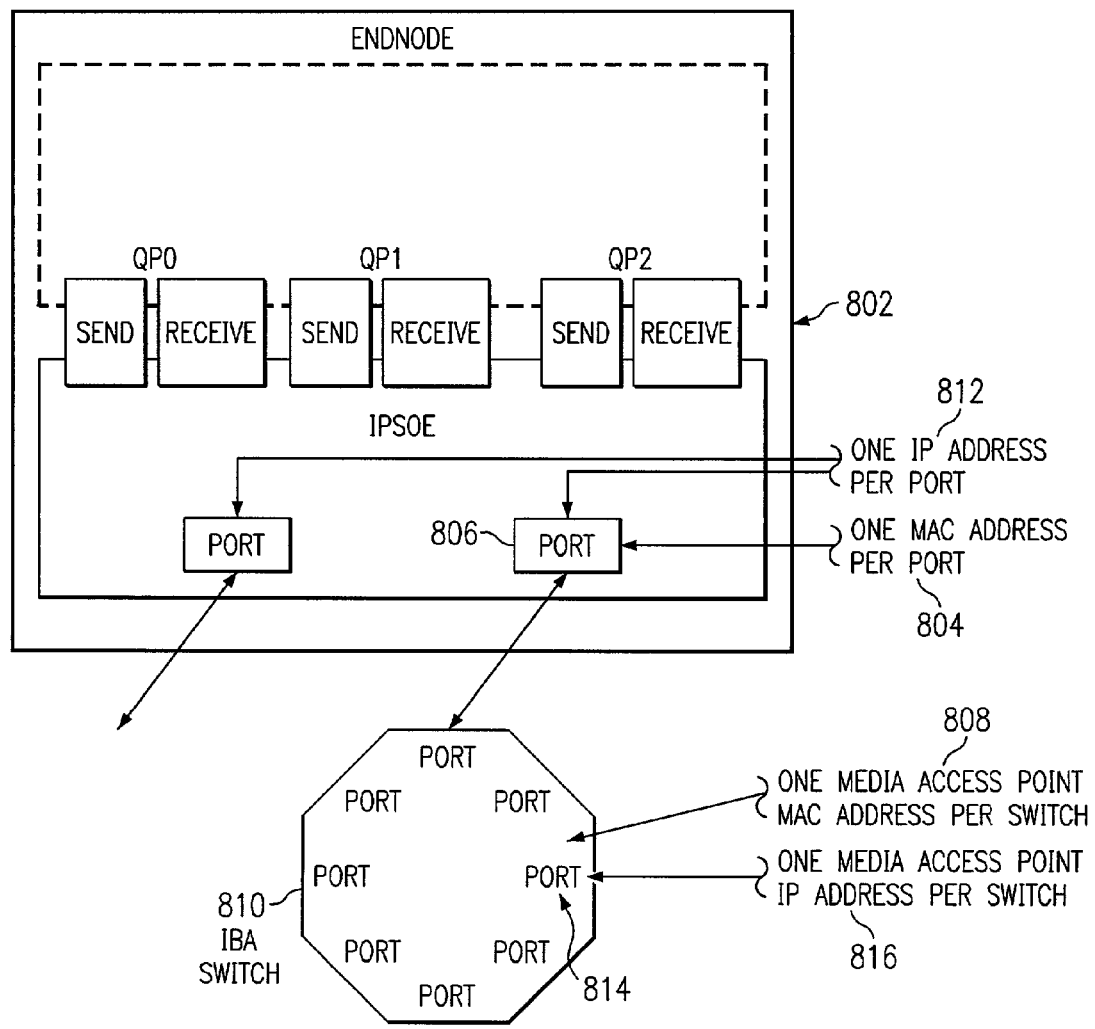
FIG. 8 is a diagram illustrating the network addressing used in a distributed networking system in accordance with the present invention.

With reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an endnode specified by the host name. Thus, there is one host name per node, but a node can have multiple IPSOEs.

A single link layer address (e.g. Ethernet Media Access Layer Address) 804 is assigned to each port 806 of a endnode component 802. A component can be an IPSOE, switch, or router. All IPSOE and router components must have a MAC address. A media access point on a switch is also assigned a MAC address.

One network address (e.g. IP Address) 812 is assigned to each port 806 of an endnode component 802. A component can be an IPSOF, switch, or router. All IPSOE and router components must have a network address. A media access point on a switch is also assigned a MAC address.

Each port of switch 810 does not have a link layer address associated with it. However, switch 810 can have a media access port 814 that has a link layer address 816 and a network layer address 808 associated with it.

Figure 9:
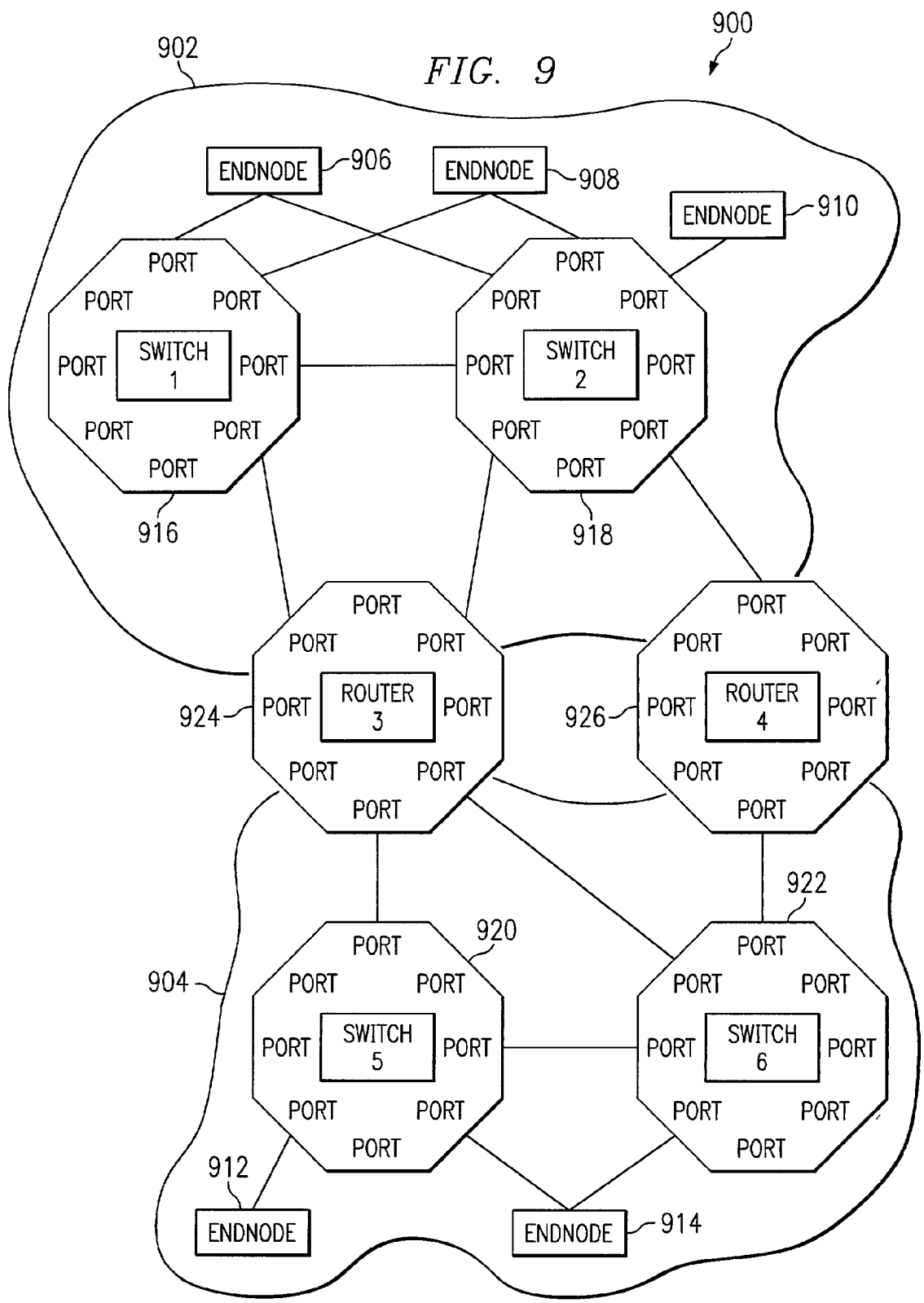
FIG. 9 is a diagram of a portion of a distributed computer system containing subnets in a preferred embodiment of the present invention.

A portion of a distributed computer system in accordance with a preferred embodiment of the present invention is illustrated in FIG. 9. Distributed computer system 900 includes a subnet 902 and a subnet 904. Subnet 902 includes host processor nodes 906, 908, and 910. Subnet 904 includes host processor nodes 912 and 914. Subnet 902 includes switches 916 and 918. Subnet 904 includes switches 920 and 922.

Routers create and connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the destination link layer address (e.g. MAC address) that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 9, for expansion to much larger systems, subnets are connected with routers, such as routers 924 and 926. The router interprets the destination network layer address (e.g. IP address) and routes the frame.

An example embodiment of a switch is illustrated generally in FIG. 3B. Each I/O path on a switch or router has a port. Generally, a switch can route frames from one port to any other port on the same switch.

Within a subnet, such as subnet 902 or subnet 904, a path from a source port to a destination port is determined by the link layer address (e.g. MAC address) of the destination host IPSOE port. Between subnets, a path is determined by the network layer address (IP address) of the destination IPSOE port and by the link layer address (e.g. MAC address) of the router port, which will be used to reach the destination's subnet.

In one embodiment, the paths used by the request frame and the request frame's corresponding positive acknowledgment (ACK) frame are not required to be symmetric. In one embodiment employing oblivious routing, switches select an output port based on the link layer address (e.g. MAC address). In one embodiment, a switch uses one set of routing decision criteria for all its input ports in the switch. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses IP Suite Offload Engine hardware through one or more queue pairs, such as the queue pairs illustrated in FIGS. 3A, 5, and 8. The client process calls an operating system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the IP net fabric must be sufficiently specified to allow devices to interoperate in a heterogeneous vendor environment.

In one embodiment, IPSOE hardware detects work queue element postings and accesses the work queue element. In this embodiment, the IPSOE hardware translates and validates the work queue element's virtual addresses and accesses the data.

An outgoing message is split into one or more data frames. In one embodiment, the IPSOE hardware adds a DDP/RDMA header, frame header and CRC, transport header and a network header to each frame. The transport header includes sequence numbers and other transport information. The network header includes routing information, such as the destination IP address and other network routing information. The link header contains the destination link layer address (e.g. MAC address) or other local routing information.

If a TCP or SCTP is employed, when a request data frame reaches its destination endnode, acknowledgment data frames are used by the destination endnode to let the request data frame sender know the request data frame was validated and accepted at the destination. Acknowledgement data frames acknowledge one or more valid and accepted request data frames. The requester can have multiple outstanding request data frames before it receives any acknowledgments. In one embodiment, the number of multiple outstanding messages, i.e. request data frames, is determined when a queue pair is created.

Figure 10:
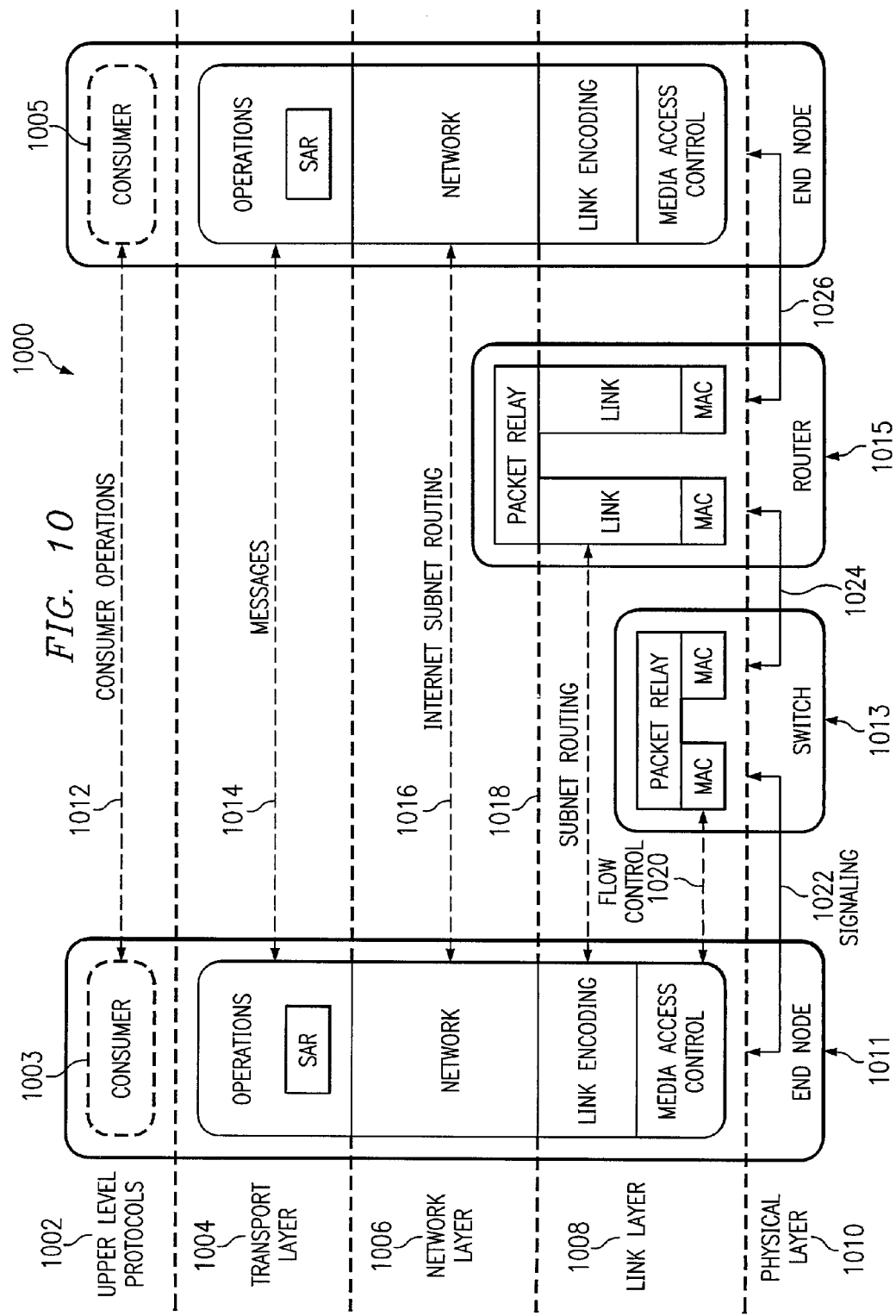
FIG. 10 is a diagram of a layered communication architecture used in a preferred embodiment of the present invention.

One embodiment of a layered architecture 1000 for implementing the present invention is generally illustrated in diagram form in FIG. 10. The layered architecture diagram of FIG. 10 shows the various layers of data communication paths, and organization of data and control information passed between layers.

IPSOE endnode protocol layers (employed by endnode 1011, for instance) include upper level protocols 1002 defined by consumer 1003, transport layer 1004, network layer 1006, link layer 1008, and physical layer 1010. Switch layers (employed by switch 1013, for instance) include link layer 1008 and physical layer 1010. Router layers (employed by router 1015, for instance) include network layer 1006, link layer 1008, and physical layer 1010.

Layered architecture 1000 generally follows an outline of a classical communication stack in order to complete consumer operations 1012 of transferring data between consumers 1003 and 1005. With respect to the protocol layers of endnode 1011, for example, upper layer protocols 1002 employs verbs to create messages at transport layer 1004. Transport layer 1004 passes messages 1014 to network layer 1006. Network layer 1006 routes frames between network subnets 1016. Link layer 1008 routes frames within a network subnet 1018. Physical layer 1010 sends bits or groups of bits to the physical layers of other devices. Each of the layers is unaware of how the upper or lower layers perform their functionality.

Consumers 1003 and 1005 represent applications or processes that employ the other layers for communicating between endnodes. Transport layer 1004 provides end-to-end message movement. In one embodiment, the transport layer provides four types of transport services as described above which are traditional TCP, RDMA over TCP, SCTP, and UDP. Network layer 1006 performs frame routing through a subnet or multiple subnets to destination endnodes. Link layer 1008 performs flow-controlled 1020, error checked, and prioritized frame delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

Figure 11:
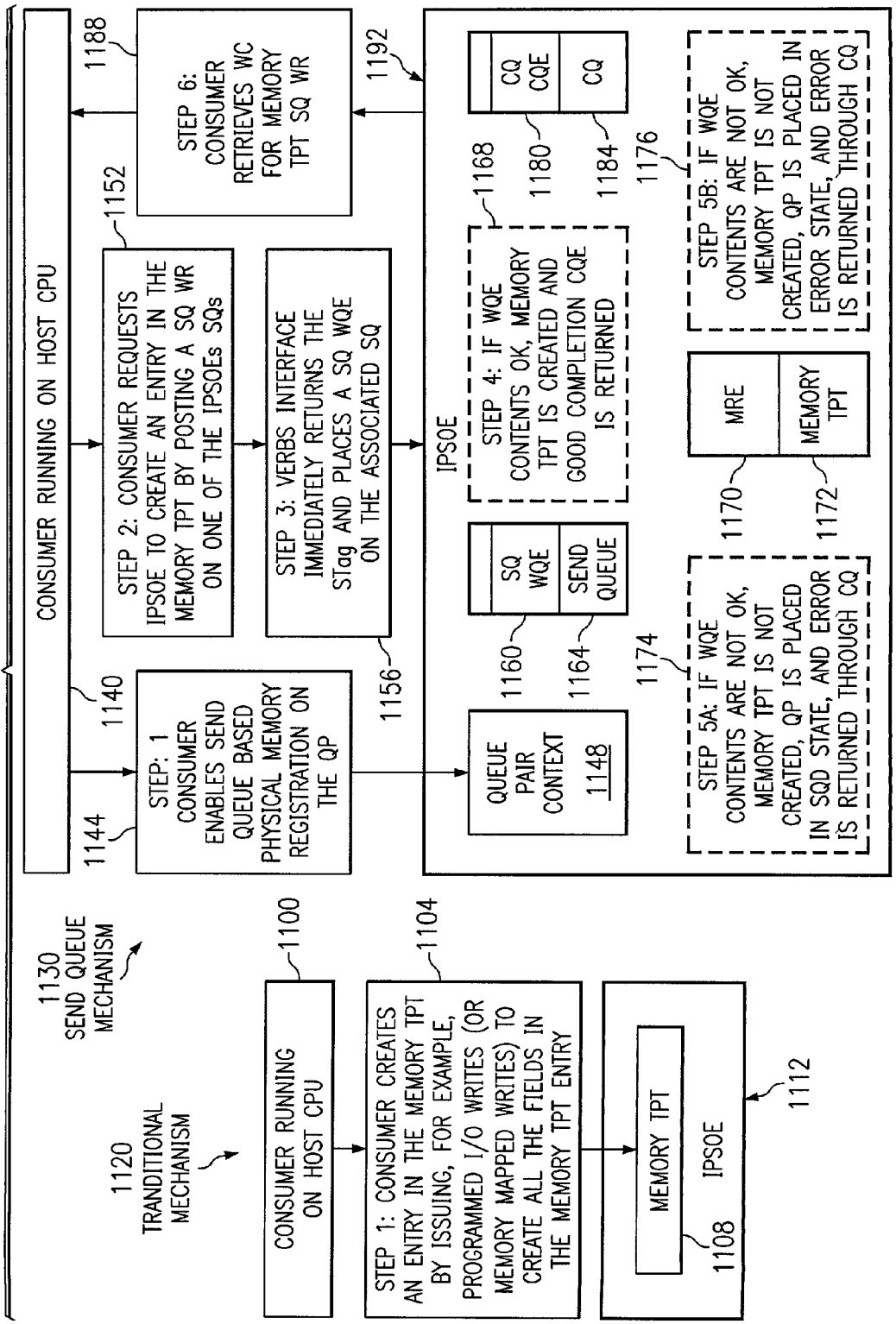
FIG. 11 is a flowchart and diagram illustrating two Memory Registration mechanisms in accordance with a preferred embodiment of the present invention.

Turning now to FIG. 11, a flowchart and diagram illustrating two Memory Registration mechanisms in accordance with a preferred embodiment of the present invention are provided. In the "Traditional Mechanism" (1120) for registering a Memory Region with the IPSOE, Consumer 1100, uses a single step 1104 to register the Memory Region with the IPSOE. The single step uses either Memory Mapped I/O (MMIO), Programmed I/O (PIO), or perhaps a Direct Memory Access (DMA) CPU assist to transfer the Memory Translation and Protection Table (TPT) entry into IPSOE 1112's Memory TPT 1108. If the Traditional Mechanism uses MMIOs or PIOs to perform the transfer, the Consumer must wait for these MMIOs or PIOs to return control to the Host CPU before the Consumer can use the newly create Memory TPT. Depending on the implementation the delay may degrade system performance.

FIG. 11 also shows a Send Queue based Physical Memory Registration Mechanism 1130. Under this mechanism, Physical Memory Registration through the Send Queue is explicitly exposed through the verbs used by the Consumer to access the IPSOE. Consumer 1140 must first enable the use of this mechanism on the QP. This is the first step (1144) of the Send Queue based Physical Memory Registration Mechanism. This step consists of by setting the Enable Send Queue based Physical Memory Registration field in QP Context 1148. After the QP Context has been enabled to support Send Queue based Physical Memory Registration, (1152) Consumer 1140 requests the IPSOE 1192 to create an entry in the Memory TPT 1172 by posting a Send Queue (SQ) Work Request (WR) on one of the IPSOEs SQs, such as SQ 1164. The Verbs interface immediately returns the STag associated with the Memory Registration WR, converts the Memory Registration WR into a SQ Work Queue Element (WQE) 1160, and places the Memory Registration WQE into the SQ 1164 (step 1156). Upon receiving the immediate return, Consumer 1140 may begin using the STag in local or remote WRs placed on the same SQ 1164.

When IPSOE 1192's SQ 1164 processes the Physical Memory Registration WQE 1160, it validates the Memory Registration WQE. If the QP has the Send Queue based Physical Memory Registration Mechanism enabled and the STag is valid (e.g. STag points to an entry in the Memory TPT and the STag Tag_Instance matches the Tag_Instance in that entry and there is enough space in the Memory TPT for the new entry), then the new Memory TPT entry 1172 is created (step 1168).

If the Memory Registration WQE encounters an error (e.g. STag does not point to an entry in the Memory TPT, or the STag Tag_Instance does not match the Tag_Instance in the entry pointed to by the STag, or the entry pointed to by the STag does not have enough space for the new Memory TPT entry), there are two semantic options for an implementation to take. Option 1 (step 1174) is reactive and presumes that Consumer 1140 is not keeping track of the Memory TPT space. If an IPSOE implementation uses option 1, then the following process is performed: the IPSOE places the QP associated with the SQ in the Send Queue Drained State, stops processing WQEs subsequent to Memory Registration WQE 1160 (but continues processing all RQ WQEs, all incoming RDMA Read Requests, any Terminate message, and all preceding SQ WQEs), generates a completion error CQE 1180 identifying the error in the Memory Registration WQE, places CQE 1180 in Completion Queue 1184, and returns all subsequent SQ WQEs with a Flush error CQE through CQ 1184. Consumer 1140 can retry the Memory Registration WR that was completed in error and all subsequent WRs.

Option 2 (step 1176) is anticipatory and presumes that Consumer 1140 is keeping track of the Memory TPT space. That is, Consumer keeps track of how the Memory TPT space is being used by IPSOE 1192. Under this option, Consumer 1140 only issues Memory Registration WRs that are guaranteed to have enough space in the Memory TPT. If an IPSOE implementation uses option 2, then the following process is performed: the IPSOE places the QP associated with the SQ in the Error State, stops processing all local and remote operations, issues a Terminate Message to bring down the RDMA Stream, generates a completion error CQE 1180 identifying the error in the Memory Registration WQE, places CQE 1180 in Completion Queue 1184, and returns all other SQ and RQ WQEs with a Flush error CQE through CQ 1184.

Finally (step 1188), Consumer 1140 retrieves the result of the Physical Memory Registration WR through a Work Completion 1188.

Figure 12:
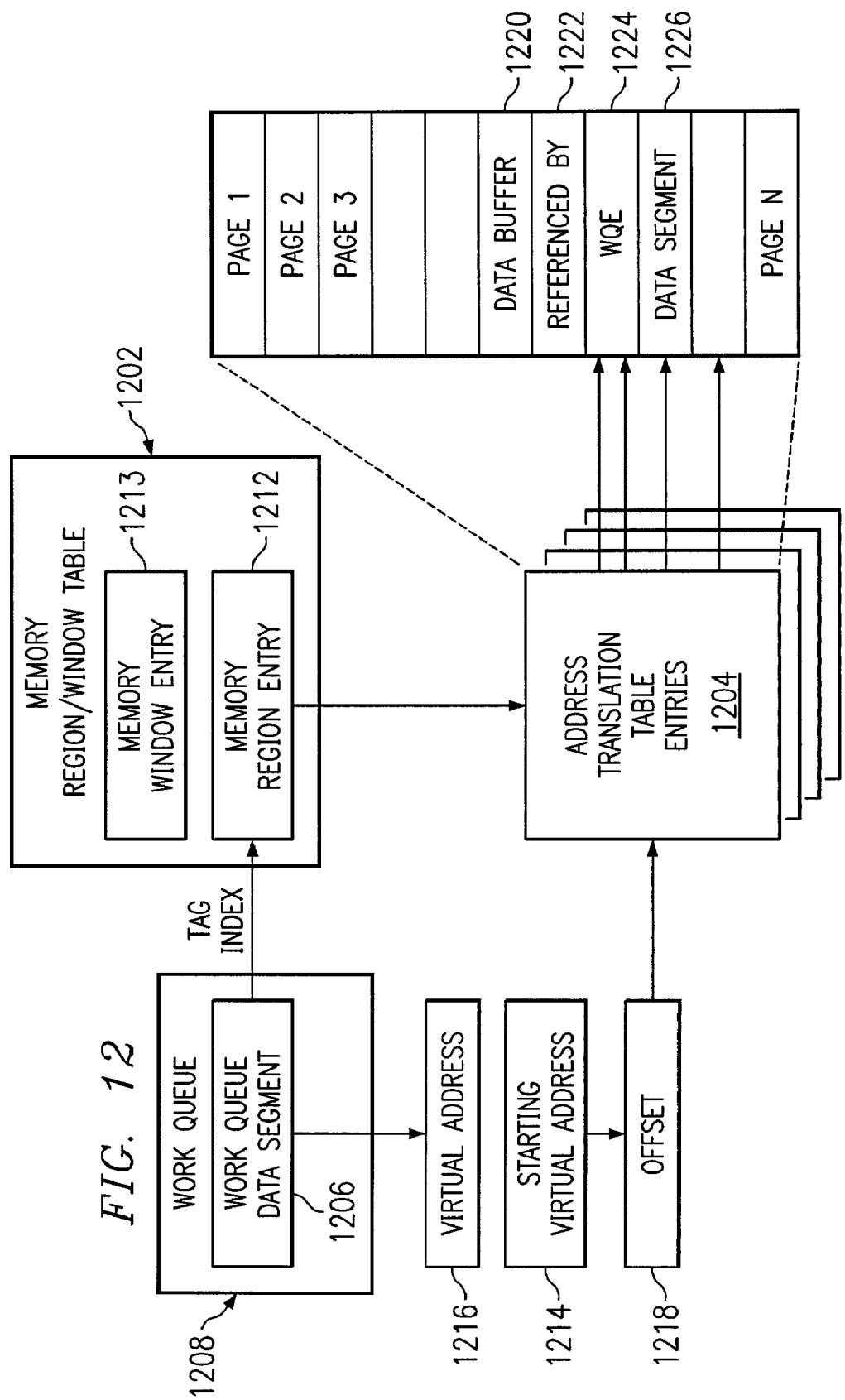
FIG. 12 depicts the memory management system in accordance with a preferred embodiment of the present invention.

Turning next to FIG. 12, a diagram of a memory management system is depicted in accordance with a preferred embodiment of the present invention. Memory management system 1200 employs a two-table memory translation and protection management structure, which includes memory region/window table 1202 and address translation tables 1204. Together these tables are known as the Memory Translation and Protection Table (Memory TPT). Memory region/window table 1202 contains information used by IPSOE hardware to determine whether access to an area of memory referenced in a work request or a remote operation is authorized. In this example, the access may be requested in WQE data segment 1206 within work queue 1208. Address translation tables 1204 contain the information used to to convert a virtual address provided in WQE data segment 1206 into a list of one or more real addresses of pages making up a data buffer within a memory region, such as memory region 1210. The data buffer may encompass one or more pages in these examples.

When a WQE data segment, such as WQE data segment 1206 is received, the key index within the WQE data segment is used as an index into memory region/window table 1202 to identify a memory region entry or a memory window entry within the memory region/window table, such as memory region entry 1212 or memory window entry 1213. Memory region table entry 1212 is used to determine whether the requested memory access is authorized for the memory region defined by the memory region entry. If access is authorized, then an address translation table 1204 is accessed. Multiple address translation tables are present in which one address translation table is used for every memory region/window defined. Each entry in an address translation table is the real address of a page that makes up part of the memory region/window. Entries are arranged in ascending order corresponding to the incrementing virtual address associated with the memory region/window. The IPSOE hardware indexes into the address translation table 1204 based on the offset into the memory region/window, which is calculated by subtracting starting virtual address 1214 of the memory region/window obtained from memory region/window table entry 1212 from virtual address 1216 specified in the work request or remote operation packet header. This result forms offset 1218 into the area of memory to be accessed. The low order bits of this offset are used to index into the page specified in the address translation table entry, and the high order bits are used to index into the address translation table. In this example, offset 1218 results in a translation of the address into real addresses identifying pages 1220-1226 as those containing the data buffer referenced by WQE data segment 1206.

Figure 13:
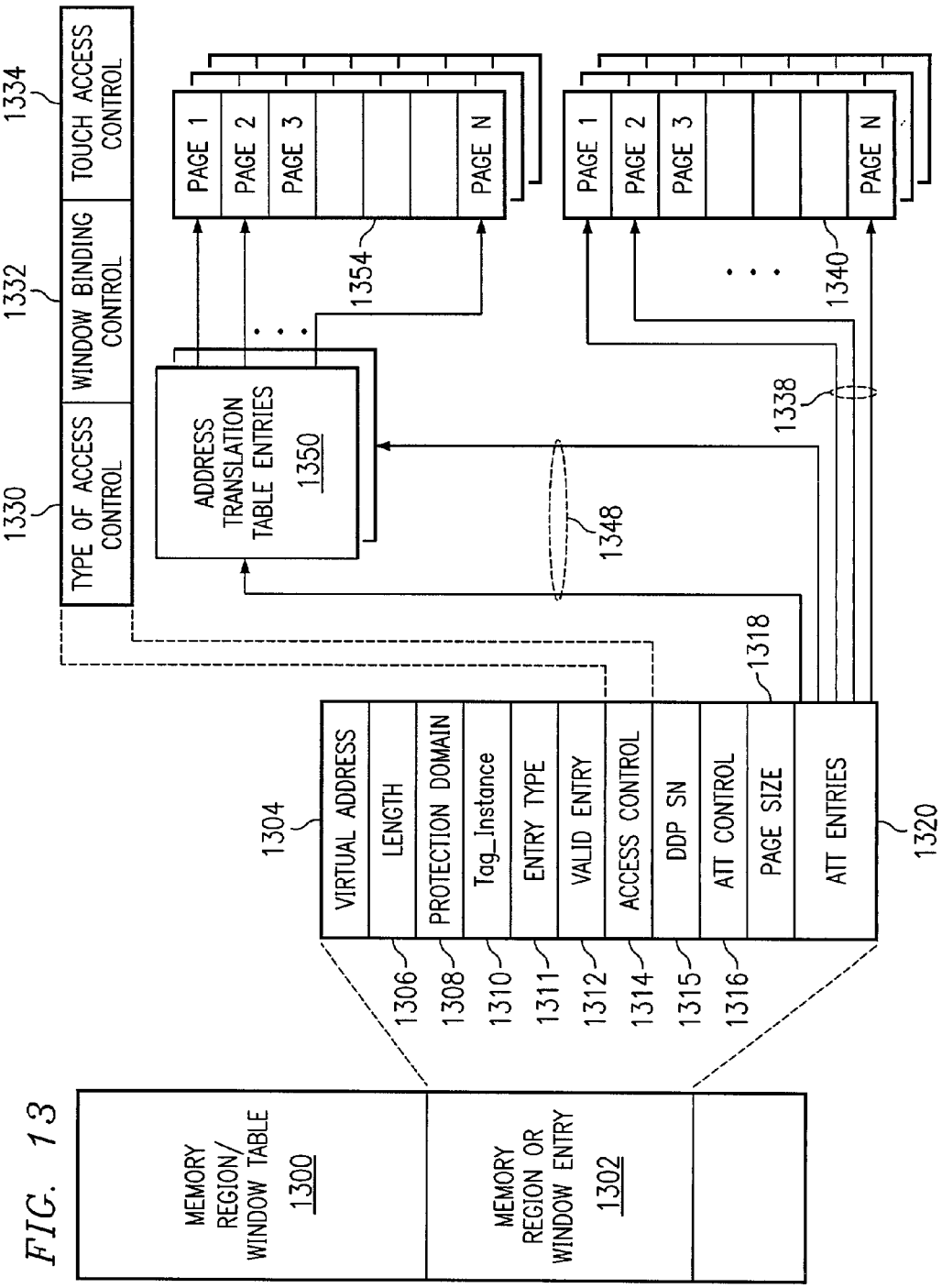
FIG. 13 is a diagram depicting memory region table entries in accordance with a preferred embodiment of the present invention.

FIG. 13 depicts the layout of a memory region/window table (MRWT) 1300 and the Memory Region and Memory Window Entries that are inserted upon the registration of a memory region or the bind of a memory window with an underlying memory region, respectively, in accordance with a preferred embodiment of the present invention.

In this example, the memory region/window entry 1302 includes the virtual address of the start of memory region/window 1304, length of memory region/window 1306, protection domain 1308, tag_instance 1310, entry type 1311, valid entry 1312, access control 1314, iSCSI control 1315, ATT control 1316, page size 1318, and address translation pointer 1320.

Each entry in memory region/window table 1300 defines the characteristics of a memory region or a memory window. A Memory Region Entry (1302) is used to describe a Memory Region. A Memory Window Entry (1303) is used to describe a Memory Window. The remainder of this section will describe the contents of the Memory Region Entry. Except where noted otherwise, the description is applicable to a Memory Window Entry, because both MREs and MWEs contain the same fields. Though the Memory Window Entry can be optimized to use the Address Translation Table of the Memory Region that the Memory Window is bound to.

A portion of the STag that is used to reference the data buffer is called the Tag_Index, and this is used by the IPSOE hardware to index into the memory region/window table to obtain the memory region table entry (MRE) for the memory region that is to be accessed. More specifically, the STag Tag_Index is used to reference the memory region. The STag of the memory region are included in the Bind WQE.

Virtual address 1304 of the start of the memory region and length 1306 of the memory region define the bounds of the memory region. Protection domain (PD) 1308 is used to determine if the QP originating the work queue request has authorization to access this memory region. That is, the PD value stored in the Memory Region Entry must match the PD value stored in the QP. Tag_Instance 1310 is the value of the Tag instance associated with the memory region and is used to validate the portion of the STag that is not part of the Tag_Index. The Tag_Instance provides access control when the definitions of memory regions change. More specifically, the STag Tag_Instance is validated with the Tag_Instance stored in the memory region entry for the region.

Entry Type 1311 specifies whether the entry is for: an RDMA Region, an RDMA Window, or iSCSI. It can be implemented as two bits, with three values used and one reserved or as three bits.

The following example is for a two bit implementation: if the Entry Type field is '00'b, then the entry is for RDMA Region; if the Entry Type field is '01'b, then the entry is for a RDMA Window; if the Entry Type field is '10'b, then the entry is for a iSCSI Region; and an Entry Type field of '11'b is reserved and unused.

If the entry is for a RDMA Region (including iSCSI-R), then the first Address Translation Table entry for the Memory Region points to the byte offset into the first physical page associated of the Memory Region. If the entry is for a RDMA Window (including iSCSI-R), then the first Address Translation Table entry for the Memory Window can be implemented as an index into the Memory Region's ATT which is bound to the Memory Window. If the entry is for iSCSI 1.0, then the Virtual Address 1304 field is used as a pointer to a WQE in the send queue that contains the iSCSI command and the first Address Translation Table entry for the iSCSI 1.0 Region points to the byte offset into the first physical page associated of the iSCSI 1.0 Region.

Valid Entry 1312 denotes whether the entry is valid or invalid. Valid Entry 1312 can be implemented as a single bit. If the bit is set, the entry is valid, otherwise it is not valid.

Access control 1314 determines the write access rights for this memory region. The Access Control 1314 field contains three sub-fields: Type of Access Control 1330, Window Binding Control 1332, and Touch Access Control 1334.

The Type of Access Control 1330 field contains four distinct access types: local read, local write, remote read, and remote write access. These distinct access types can be encoded as four bits, where if a bit is set, the access type associated with the bit is enabled. If a bit is not set, the access type associated with the bit is disabled. For example, if the local write access bit is set, local write access is enabled. If the local write access bit is not set, local write access is disabled. Note: if standard specifications prohibit Windows from being used for local access, then a Memory Window Entry would only have two distinct access types: remote read access and remote write access.

Window Binding Control 1332 field contains a single bit denoting whether Memory Windows can be bound to the Memory Region or not. If the bit is set, Memory Windows can be bound to the Memory Region. If the bit is not set, Memory Windows cannot be bound to the Memory Region.

Touch Access Control 1334 field contains at least two bits: a One Touch Enabled bit which designates whether the entry has One Touch Enabled or not; and Touched bit which only has meaning if the One Touch Enabled bit is set and designates whether the entry has been touched before or not.

A One Touch entry cannot be used after the incoming byte-stream lines up with the end of the last segment associated with the first RDMA Message that targets the entry. A Multiple Touch entry can be used after the incoming byte-stream lines up with the end of the last segment associated with the first RDMA Message that targets the Region.

For One Touch Memory Region, the Memory Region's Valid Region 1312 field is reset, when the incoming byte stream lines up with the end of the last segment associated with the first RDMA Message that targets the Region. For a Multiple Touch Memory Region, the Memory Region's Valid Region 1312 field is not affected, when the incoming byte stream lines up with the end of the last segment associated with the first RDMA Message that targets the Region. A more detailed description of this process is provided in FIGS. 18A-18B and the accompanying text.

If standard specifications enable one touch access on Windows only, then an implementation may choose to use one touch access on Memory Window Entries only (or may offer one touch access on Memory Regions as an option).

The Stored DDP Sequence Number 1315 is used to store the DDP Sequence Number associated with the last byte of the payload of a DDP Segment that has the Last bit set in the DDP Header. A more detailed description of this process is provided in FIGS. 18A-18B and the accompanying text.

ATT Control 1316 specifies whether the ATT entries reference physical page address (Direct Pointers), a list of physical page addresses (1st Order Indirect Pointers), or an indirect ATT page that contains a list of ATT pages (2nd Order Indirect Pointers). Address translation pointer 1212 references the address translation table associated with this memory region. Note the first entry in the ATT that references a physical page can point to an offset into the page. Similarly, the last entry can end at an offset from the start of the last physical page.

Page size 1318 specifies the size of the page. For example, 4 KB, 8 KB, 64 KB, 1 MB, 16 MB, and 256 MB may also be valid page sizes, as well as other possible sizes, as one skilled in the art will appreciate.

ATT Entries 1320 specifies one or more 64-bit physical addresses. If ATT Control field 1316 is set to Direct Pointers 1320, then each ATT Entry 1320 points to a physical address. If ATT Control field 1316 is set to 1st Order Indirect Pointers 1338, then each ATT Entry 1320 points to a list of Physical Addresses 1340. If ATT Control field 1316 is set to 2nd Order Indirect Pointers 1348, then each ATT Entry 1320 points to a list of ATT Entries 1350 and each Entry in the ATT Entries 1350 points to a list of Physical Addresses 1354.

Figure 14:
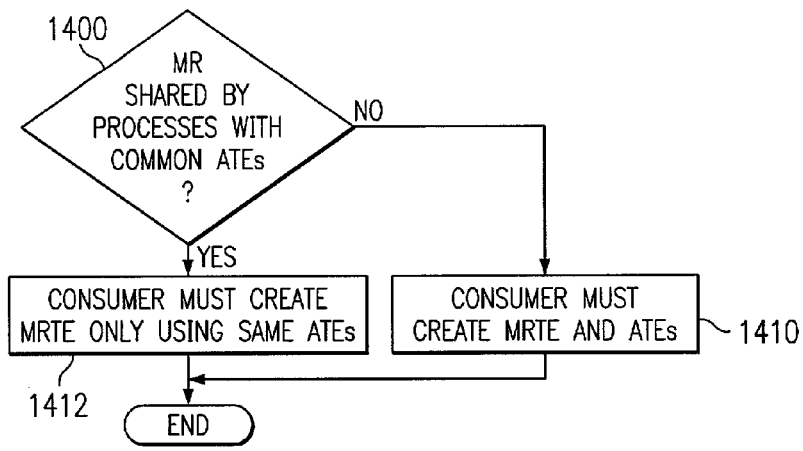
FIG. 14 is a flowchart depicting the checks that must be made upon registering a memory region in accordance with a preferred embodiment of the present invention.

FIG. 14 is a flowchart of the process used by a Memory Registration Consumer (Consumer for short) to register a Memory Region in accordance with a preferred embodiment of the present invention. First, the Consumer checks to see if the memory region is shared by multiple processes with common address translation table entries (step 1400). If the memory region is not shared in this way (step 1400: No), then both the memory region table entry (MRTE) and address translation table entries (ATTE) must be created (step 1410) by the Consumer. If multiple processes use common address translation table entries (step 1400: Yes) to share the memory, then the Consumer must create only the MRTE using the same ATTEs (step 1412).

We now turn to FIG. 15, which is a flowchart and diagram representation of the process used by the IPSOE to validate memory accesses performed by Work Queue Elements posted by the Consumer as Work Request on an IPSOE Work Queue, in accordance with a preferred embodiment of the present invention.

First (step 1552), the Consumer 1540 posts a Work Request into an IPSOE Work Queue 1564. The Work Queue can either be a Send Queue or a Receive Queue. The Work Request contains zero or more Data Segments. For RDMA (including iSCSI-R), each Data Segment contains a STag, Virtual Address, and Length. For iSCSI 1.0: a single STag is used for all Data Segments in the WR; each Data Segment in the WR contains a physical address; the first Data Segment contains an additional field that is used to define the starting offset into the first physical page; the last Data Segment also contains an additional field that is used to define the ending offset into the last physical page; and all intermediate Data Segments only contain a physical address, because the intermediate pages must start and end on a page boundary.

Next (step 1556), the verbs interface converts the WR into a Work Queue Element (WQE) and places WQE 1560 into WQ 1564.

Then (step 1568), the IPSOE 1592 accesses the WQE 1560. If the WQ 1564 is a RDMA (including iSCSI-R) WQ, then each Data Segment referenced in WQE 1560 is validated. The validation includes the following checks: a) the Valid Entry field is set; b) the Entry Type for the entry is set to region (i.e. windows cannot be used for local access); c) the PD (protection domain) in the QP context associated with WQ 1564 matches the PD of Memory Region Entry 1570 referenced by the Data Segment's STag; d) the portion of the Data Segment's STag that is the Tag_Instance matches Tag_Instance in the MRE 1570; e) the base address and length of the Data Segment is within the range of addresses associated with the MRE 1570; f) the type of access is valid (SQ RDMA Write and Send WRs, require local read access; and RQ WRs require local write access); and g) for SQ Bind WR, the MRE 1570 being bound to the memory window has window access enabled. Note: if the WR is a SQ Bind WR and it requests that one touch access be set for the associated Window, then the one touch access bit will be set when the IPSOE creates the associated Window.

If the WQ, is a iSCSI 1.0 WQE, then the STag provided in the WQE is used to create an iSCSI Memory Region from the list of Data Segments provided in the WQE. iSCSI 1.0 Memory Regions are referenced from a zero base, because they do not have a virtual address field.

If the Data Segment provided by the Consumer is valid, then the associated Memory Region is accessed and the WQE is processed. Upon good completion a CQE is returned through the CQ associated with the WQ.

Next (step 1576), If any of the Data Segments are invalid, then the associated Memory Region is not accessed and an error is returned through a CQE 1580 on the CQ 1584 associated with the WQ 1564.

Finally, in step 1588, Consumer 1540 retrieves a WC for the WR submitted in step 1552.

Figure 16:
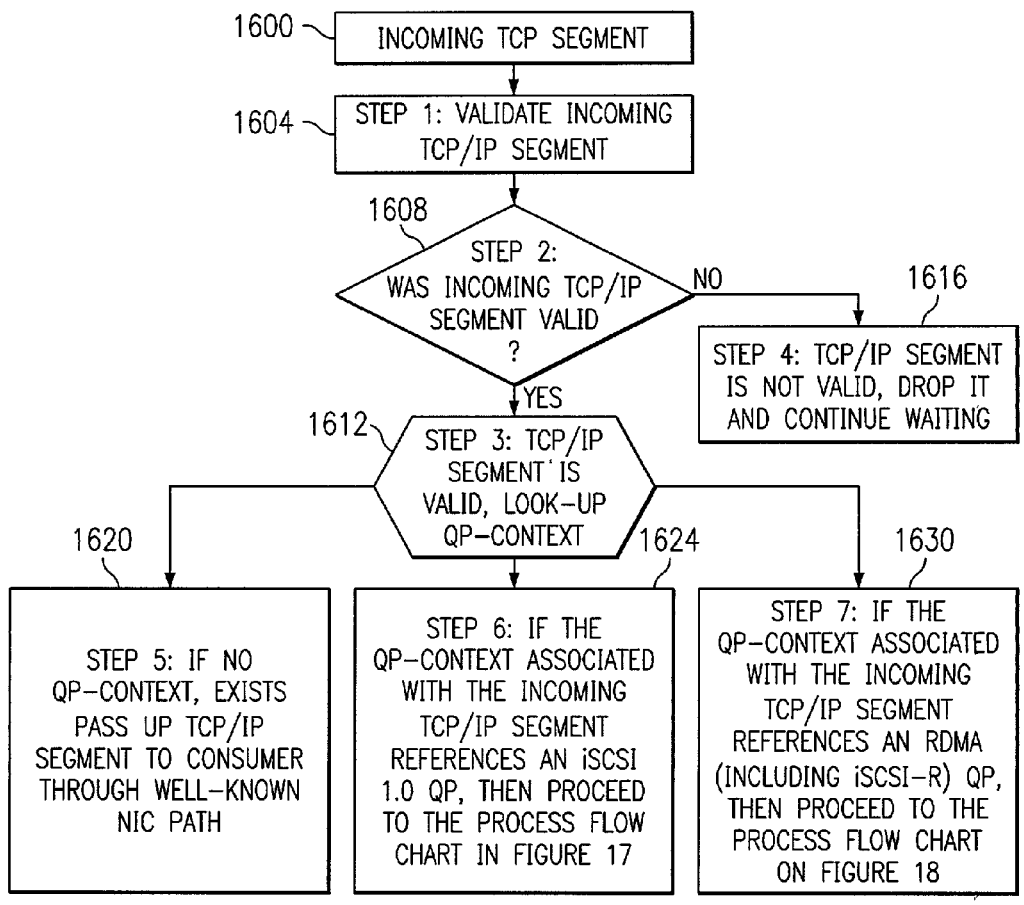
FIG. 16 is a flowchart and diagram representation of a process used to distinguish between the different types of streams that can be associated with a remote operation in accordance with a preferred embodiment of the present invention.

We now turn to FIG. 16, which is a flowchart and diagram representation of the process used to distinguish between the different types of streams that can be associated with a remote operation.

The IPSOE receives an incoming TCP/IP Segment 1600.

In step 1604, The IPSOE uses well-known TCP/IP/Ethernet validation mechanisms to validate an incoming TCP Segment 1604. In step 1608, IPSOE checks if an error was encountered during TCP/IP Segment validation. If incoming TCP/IP Segment is valid, the process continues to step 1612. Otherwise 1616 the segment is dropped and the process continues waiting for TCP/IP Segment (step 1616).

In step 1612, after the validation process is completed, the TCP/IP quintuple (Transport Type, Destination TCP Port Number, Source TCP Port Number, Destination IP Address, and Source IP Address) of the incoming TCP Segment is used to access the QP Context associated with the incoming TCP Segment.

In step 1620, if no QP Context exists for the incoming TCP Segment, then the Consumer is not using any of the IPSOE's TCP/IP Offload mechanisms and the incoming TCP Segment is passed up to the Consumer through well-known traditional NIC mechanisms.

In step 1624, If the incoming TCP Segment references a iSCSI 1.0 QP Context, then the processing described in FIG. 17 is performed on the incoming TCP Segment.

In step 1630, If the incoming TCP Segment references a RDMA (including iSCSI-R) QP Context, then Marker with PDU Alignment (MPA) mechanism is used to by the IPSOE to retrieve a DDP Segment and its associated DDP Header and the processing described in FIGS. 18A-18B is performed on the incoming TCP Segment.

Figure 17A:
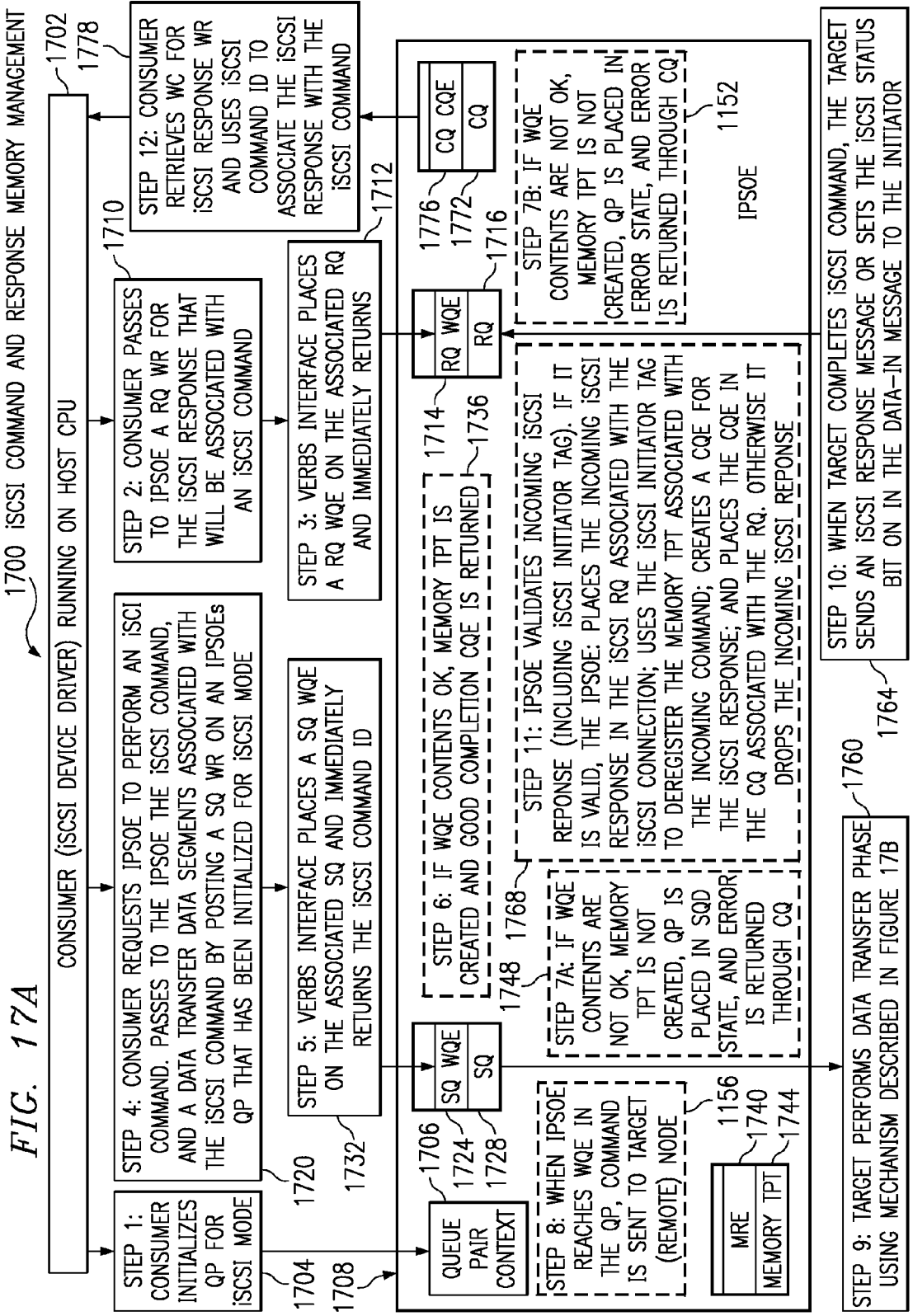
FIG. 17A is a flowchart and diagram illustrating memory management mechanisms associated with an iSCSI QP in accordance with a preferred embodiment of the present invention.

FIG. 17A is a flowchart and diagram illustrating the Memory Registration and Deregistration mechanisms associated with an iSCSI QP in accordance with a preferred embodiment of the present invention. FIG. 17a shows the memory management functions associated with a QP that has been initialized in iSCSI mode, such as QP Context 1706 in IPSOE 1708.

In step 1704, when Consumer 1702 (which is typically an iSCSI Device Driver running in the host CPU's Operating System Kernel) initializes QP Context 1706, Consumer 1702 sets the mode of the QP to iSCSI 1.0. When a QP Context has been initialized in iSCSI mode, the Work Request posted to the QP's Send Queue, such as SQ 1728, contains the iSCSI Command and a list of Data Transfer Data Segments associated with the SCSI Command. The IPSOE will follow the flowchart described in FIG. 17A to: create (register) a Memory TPT entry for the iSCSI Command and the Data Transfer Data Segments associated with the iSCSI Command; issue the iSCSI Command to the Target; perform the data transfer associated with the iSCSI Command (FIG. 17B) and upon reception of the iSCSI Response destroy the iSCSI Command's Memory TPT entry (deregister) and create a WC containing the iSCSI Response.

Before Consumer 1702 can send an iSCSI Command to the Target, Consumer 1702 must create a RQ WQE to receive the iSCSI Response. In step 1710, Consumer 1702 passes a RQ WR to IPSOE 1708 for the iSCSI Response that will be associated with an iSCSI Command. The Verbs interface, in step 1712, validates the RQ WR and if valid the Verbs interfaces creates a RQ WQE 1714 from the WR, places RQ WQE 1714 in the associated RQ 1716, and immediately returns to the Consumer 1702. If the WR is not valid, the Verbs interface returns an error to the Consumer 1702.

In step 1720, Consumer 1702 then requests the IPSOE 1708 to perform an iSCSI Command by passing a SQ WR to the IPSOE containing the iSCSI Command and the Data Transfer Data Segments associated with the iSCSI Command. The Verbs interface, in step 1732, validates the SQ WR and if valid the Verbs interfaces creates a SQ WQE from the WR, places the SQ WQE 1724 in the associated SQ 1728, and immediately returns an iSCSI Command ID to the Consumer 1702. The Command ID is used between the Consumer and the IPSOE to associate the iSCSI Response with the iSCSI Command. If the WR is not valid, the Verbs interface returns an error to the Consumer 1702.

When IPSOE 1708's SQ 1728 processes iSCSI Command SQ WQE 1724, it validates the WQE. In step 1736, if the QP is initialized to iSCSI mode, the iSCSI Command is valid for the type of device it will be sent to, and the Data Transfer Data Segments associated with the iSCSI Command are valid (e.g. they do not wrap), and there is enough space in the Memory TPT for the new entry, then new iSCSI Memory TPT entry 1740 is created in Memory TPT 1744.

If iSCSI Command SQ WQE 1724 encounters an error (e.g. there isn't enough space in the Memory TPT for another entry or the iSCSI Command op-code is invalid for the type of device being referenced), then there are two semantic options for an implementation to take. Option 1 (step 1748) is reactive and presumes that Consumer 1702 is not keeping track of the Memory TPT space. If an IPSOE implementation uses option 1, then the following process is performed: the IPSOE places the QP associated with the SQ in the Send Queue Drained State, stops processing WQEs subsequent to iSCSI Command SQ WQE 1724 (but continues processing all RQ WQEs, all incoming R2Ts, all preceding SQ WQEs, and other incoming iSCSI Control Messages), generates a completion error CQE 1776 identifying the error in iSCSI Command SQ WQE 1724, places CQE 1776 in the Completion Queue 1772, and returns all subsequent SQ WQEs with a Flush error CQE through CQ 1772. Consumer 1772 can retry the iSCSI Command WR that was completed in error and all subsequent WRs.

Option 2 (step 1152) is anticipatory and presumes that Consumer 1702 is keeping track of the Memory TPT space. That is, the Consumer keeps track of how the Memory TPT space is being used by the IPSOE. Under this option, Consumer 1702 only issues iSCSI Command WRs that are guaranteed to have enough space in the Memory TPT. If an IPSOE implementation uses option 2, then the following process is performed: the IPSOE places the QP associated with the SQ (QP 1706) in the Error State, stops processing all local and remote operations, terminates the iSCSI Stream, generates a completion error CQE 1776 identifying the error in the iSCSI Command SQ WQE, places CQE 1776 in Completion Queue 1772, and returns all other SQ and RQ WQEs with a Flush error CQE through CQ 1772.

In step 1156, when the IPSOE Target Side Processing logic reaches the iSCSI Command SQ WQE, the IPSOE sends the iSCSI Command to the Target.

The flowchart in FIG. 17B, which is described below, describes a mechanism used by the IPSOE to perform the data transfer phase of the iSCSI Command in accordance with a preferred embodiment of the present invention.

When the Target completes the iSCSI Command, (step 1764), the Target sends an iSCSI Response (or, for Device Reads, includes the iSCSI Status in a Data-In Message) to the initiator.

In step 1768, when the IPSOE receives the iSCSI Response the IPSOE validates that QP Context 1706 is associated with the stream (e.g., via SCTP) or connection (e.g., via TCP) that received the iSCSI Response. For TCP/IP, the IPSOE performs this step by assuring that the quintuple (Transport Type, Destination Port Number, Source Port Number, Destination IP Address, and Source IP Address) associated with the incoming iSCSI Response matches the quintuple associated with the QP Context. The IPSOE then validates the other iSCSI and TCP fields associated with the iSCSI Response Message (e.g. the Sequence Number in the TCP Segment containing the iSCSI Response matches the next expected Sequence Number stored in the QP). The IPSOE then uses the Tag_Index portion of the iSCSI Initiator Tag to look-up the Memory TPT entry (1740) associated with the iSCSI Response. The IPSOE validates the Tag_Instance portion of the iSCSI Initiator Tag.

If the incoming iSCSI Response is valid (including the Tag_Instance portion of the iSCSI Initiator Tag), then IPSOE 1708: accesses Memory TPT entry 1740 to retrieve the Command ID of the iSCSI Command that is associated with the iSCSI Response; retrieves the Command ID from Memory TPT entry 1740; destroys (deregisters) Memory TPT entry 1740; and places the Command ID and the incoming iSCSI Response into RQ WQE 1714 of the QP associated with the incoming iSCSI Response. Otherwise IPSOE 1708 drops the incoming iSCSI Response.

Finally, in step 12 1778, the Consumer 1702 retrieves the WC containing the iSCSI Command ID and the iSCSI Response. The Consumer 1702 uses the iSCSI Command ID to associate the iSCSI Response with the iSCSI Command.

The mechanism described in FIG. 17A can be applied to a general purpose QP. That is, the memory registration step can be combined with a general purpose WR and the deregistration step can be performed when the remote node sends a message containing the Tag (e.g. Steering Tag) that is to be deregistered.

Figure 17B:
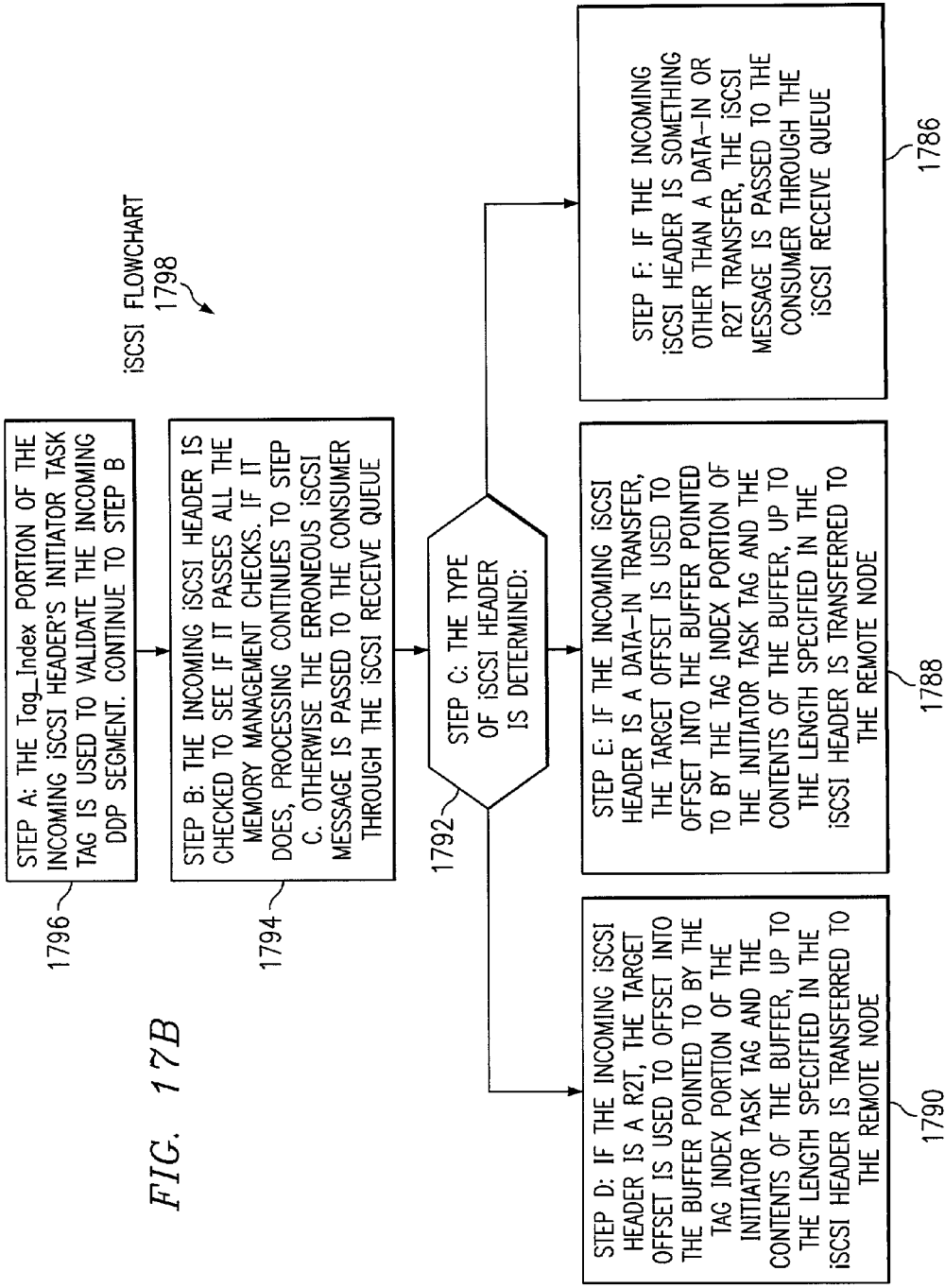
FIG. 17B is a flowchart and diagram representation of a memory management process used to validate a remote iSCSI 1.0 operation in accordance with a preferred embodiment of the present invention.

FIG. 17B is a flowchart and diagram representation of a memory management process used to perform the initiator data transfer portion of iSCSI that validates a remote iSCSI 1.0 data transfer (e.g. R2T or Data-In) operation in accordance with a preferred embodiment of the present invention. The implementation described below only covers the data transfer messages. Non-data transfer messages are passed up to the consumer through the iSCSI QP's Receive Queue.

In step 1796, the Tag_Index portion of the incoming iSCSI Header's Initiator Task Tag is used to validate the incoming DDP Segment. Continue to step B.

In step 1794, the following checks are performed on the entry that has been indexed by the Tag_Index portion of the incoming iSCSI Header's Initiator Task Tag: a) the Valid Entry field is set; b) the Entry Type for the entry is set to iSCSI 1.0 (i.e. Regions or Windows cannot be used for iSCSI 1.0); c) the PD in the QP context associated with the incoming TCP Segment matches the PD of the Memory TPT Entry; d) the portion of the iSCSI 1.0 Header's Initiator Task Tag that is the Tag_Instance matches Tag_Instance in the Memory TPT Entry; e) the Offset of the incoming iSCSI 1.0 Segment's Header does not exceed the size of Length field stored in the Memory TPT Entry; f) the type of access is valid (e.g. for R2T the Memory TPT Entry has remote read access enabled and for Data-In the Memory TPT Entry has remote write access enabled) and g) the Initiator's iSCSI Command (looked up by using the Virtual Address field of the Memory TPT entry) matches the incoming (Target) iSCSI message's action (i.e. Initiator iSCSI Command is a Disk Write and the incoming iSCSI Message is a R2T or the iSCSI Command is a Disk Read and the incoming iSCSI Message is a Data). If these checks pass, processing continues to step 1792. Otherwise the erroneous iSCSI Message is passed to the Consumer through the iSCSI QP's Receive Queue.

In step 1792, the type of iSCSI message is determined. In step 1790, if the incoming iSCSI Header is a R2T, the Target Offset is used to offset into the buffer pointed to by the Tag Index portion of the Initiator Task Tag and the contents of the buffer, up to the length specified in the iSCSI header is transferred to the remote node. The iSCSI Header's control information is passed to the Consumer through the iSCSI QP's Receive Queue.

In step 1788, if the incoming iSCSI Header is a Data-in Transfer, the Target Offset is used to offset into the buffer pointed to by the Tag Index portion of the Initiator Task Tag and the contents of the buffer, up to the length specified in the iSCSI Header is transferred to the remote node. The iSCSI Header's control information is passed to the Consumer through the iSCSI QP's Receive Queue.

In step 1786, if the incoming iSCSI Header is something other than a Data-in or R2T Transfer, the entire iSCSI message (control information and any data) is passed to the Consumer through the iSCSI QP's Receive Queue.

FIGS. 18A-18B are a flowchart and diagram representation of a memory management process used in accordance with a preferred embodiment of the present invention: to provide a one touch access mechanism with the deregistration function unexposed to the remote node; and to validate the memory access associated with a remote RDMA Read Request, RDMA Read Response, and RDMA Write operation. RDMA Read Requests reference a DDP Untagged Buffer. RDMA Read Response or RDMA Write reference a DDP Tagged Buffer. It should be noted that RDMA Send Message processing is described in FIG. 11.

For RDMA Read Request 1800, if the incoming DDP Segment's Header references an Untagged Buffer with Buffer Number 2, then the incoming DDP Header's Message Sequence Number (MSN) is used to index into the RDMA Read Resource Queue. This corresponds to step 1804.

To index into the RDMA Read Request Queue the IPSOE maintains a next expected MSN. In step 1806, if the incoming DDP Header's MSN is the next expected MSN or corresponds to the MSN that would be associated with an available RDMA Read Request Queue Entry, then the incoming DDP Segment's payload (i.e. the RDMA Read Request) is placed in the RDMA Read Request Queue Entry referenced by the incoming DDP Header's MSN. Otherwise the RDMA Stream termination process is invoked by the IPSOE. The RDMA Stream termination process consists of creating a Terminate RDMA Message that contains the cause of the termination, sending the Terminate RDMA Message to the other side of the RDMA Stream, and then tearing down the RDMA Stream (e.g. by tearing down the TCP Connection).

In step 1808, the Tag_Index portion of the incoming RDMA Read Request Header's Source STag is used to validate the incoming RDMA Read Request.

In step 1812, the following checks are then performed on the entry that has been indexed by the Tag_Index portion of the incoming RDMA Read Request Header's Source STag: a) the Valid Entry field is set; b) the Entry Type for the entry is set to window (i.e. regions cannot be used for remote access); c) the PD in the QP context associated with the incoming TCP Segment matches the PD of the Memory Window Entry; d) the portion of the DDP Header's STag that is the Tag_Instance matches Tag_Instance in the MWE; e) the base address (Target Offset) and length (MPA Header Length) of the incoming DDP Segment is within the range of addresses associated with the MWE; and f) the type of access is valid (i.e. the MWE has remote read access enabled).

If all the checks pass, the IPSOE creates the RDMA Read Responses by reading the Memory Window referenced by the RDMA Read Request and issuing the RDMA Read Responses. Otherwise a Terminate Message is generated describing the cause of the error.

For RDMA Read Response or RDMA Write 1814, in step 1816, if the incoming DDP Segment's Header references a Tagged Buffer, then the Tag_Index portion of the DDP Header's STag is used to index into the Memory Region/Window Table.

In step 1820, the following checks are performed on the entry that has been indexed by the Tag_Index portion of the incoming DDP Header's STag: a) the Valid Entry field is set; b) the Entry Type for the entry is set to window (i.e. regions cannot be used for remote access); c) the PD in the QP context associated with the incoming TCP Segment matches the PD of the Memory Window Entry; d) the portion of the DDP Header's STag that is the Tag_Instance matches Tag_Instance in the MWE; e) the base address (Target Offset) and length (MPA Header Length) of the incoming DDP Segment is within the range of addresses associated with the MWE; and f) the type of access is valid (i.e. the MWE has remote write access enabled). If all the checks pass, then processing continues to step 1824, otherwise a Terminate Message is generated describing the cause of the error.

In step 1824, the following fields are checked: the DDP standard's Last bit in the incoming DDP Header (if set it indicates the incoming DDP Segment is the last DDP Segment of a RDMA Message); the One Touch Enabled bit stored in the Memory TPT entry referenced by the STag; the Touched bit stored in the Memory TPT entry referenced by the STag; Stored DDP (Byte Stream) Sequence Number stored in the Memory TPT entry referenced by the STag; the underlying TCP Byte Sequence Number; and the Last Byte of the Incoming DDP Segment's (Byte Stream) Sequence Number. In step 1828, the following set of checks is performed against the above-listed fields.

If the Last bit is not set, then the incoming DDP Header's Target Offset field is used to index into the Memory Region/Window referenced by the Memory TPT entry and the incoming DDP Segment's payload is transferred into the Memory Region/Window (starting at the TO).

If the Last bit is set and Memory TPT entry associated with the incoming DDP Segment has the One Touch Enabled bit reset, then the incoming DDP Header's Target Offset field is used to index into the Memory Region/Window referenced by the Memory TPT entry and the incoming DDP Segment's payload is transferred into the Memory Region/Window (starting at the TO).

If the Last bit is set and Memory TPT entry associated with the incoming DDP Segment has the One Touch Enabled bit set and the Touched bit is also set, then the Memory TPT entry's Valid Entry bit is reset and a Terminate Message is generated describing the cause of the error (e.g. two access attempted on a One Touch Region/Window).

If the Last bit is set and Memory TPT entry associated with the incoming DDP Segment has the One Touch Enabled bit set and the Touched bit is not set and the Last Byte of the Incoming DDP Segment's (Byte Stream) Sequence Number is equal to the Next Expected TCP Byte Sequence Number minus 1, then the Memory TPT entry's Valid Entry bit is reset and the incoming DDP Header's Target Offset field is used to index into the Memory Region/Window referenced by the Memory TPT entry and the incoming DDP Segment's payload is transferred into the Memory Region/Window (starting at the TO). This covers the case where the Incoming DDP Segment is the last segment of a Tagged Buffer Message and is received in order.

If the Last bit is set and Memory TPT entry associated with the incoming DDP Segment has the One Touch Enabled bit set and the Touched bit is not set and the Last Byte of the Incoming DDP Segment's (Byte Stream) Sequence Number is within the TCP Byte Sequence Number Window, but is not the Next Expected TCP Byte Sequence Number minus 1, then the Memory TPT entry's Touched bit is set, the (Byte Stream) Sequence Number associated with the Last Byte of the incoming DDP Segment's payload is stored in the Memory TPT entry's DDP Sequence Number field, and the incoming DDP Segment's payload is transferred into the Memory Region/Window (starting at the TO). When the incoming byte stream lines up with the end of the Memory TPT entry's DDP Sequence Number field, the Memory TPT's Valid Entry field is reset. This covers the case where the Incoming DDP Segment is the last segment of a Tagged Buffer Message and is received out of order.

If the Last bit is set and Memory TPT entry associated with the incoming DDP Segment has the One Touch Enabled bit set and the Touched bit is not set and the Last Byte of the Incoming DDP Segment's (Byte Stream) Sequence Number is outside of the TCP Byte Sequence Number Window, then the Incoming DDP Segment is dropped (the sender will resend).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   receiving a work request in an Internet protocol suite offload engine from a host, wherein the Internet protocol suite offload engine is embodied in hardware coupled to the host;
   in response to receiving the work request, registering in a translation table a memory region associated with the host, wherein the hardware maintains sequence numbers and acknowledges all frame transfers, and wherein paths used by the work request and a corresponding positive acknowledgement of the work request are asymmetric;
   translating, in the Internet protocol suite offload engine, a virtual address to a physical address associated with the memory region;
   validating, in the Internet protocol suite offload engine, the virtual address;
   accessing data associated with the virtual address;
   generating a tag associated with the memory region;
   in response to registering the memory region returning the tag to the host wherein the tag is associated with the memory region;
   performing an input/output transaction over a connection protocol in a network with a remote node using the tag to refer to the memory region wherein in the input/output transaction data is transferred using direct access to the memory region;
   wherein the memory region is registered in response to processing a combined register memory region and send work request associated with a transaction in an upper level protocol and the method further includes:
   receiving an incoming transaction send message in the upper level protocol, wherein the transaction send message includes a request to deregister a tag associated with the memory region; and
   in response to receiving the send message deregistering the memory region associated with the tag.

2. The method of claim 1, wherein the work request includes memory protection information associated with the memory region and the method further includes: storing the memory protection information in the translation table.

3. The method of claim 1, wherein the work request is received through a send queue.

4. The method of claim 1, wherein the tag includes an index into the translation table.

5. The method of claim 1, further comprising: in response to registering the memory region, placing a completion queue element on a completion queue.

6. The method of claim 1, wherein the work request includes Internet Small Computer Systems Interface command.

7. The method of claim 6, wherein the memory region is registered in response to processing an Internet Small Computer Systems Interface command and the method further includes:
   performing a transaction in fulfillment of the Internet Small Computer Systems Interface command;
   receiving an Internet Small Computer Systems Interface response associated with the transaction; and
   in response to receiving the Internet Small Computer Systems Interface response, deregistering the memory region associated with the Internet Small Computer Systems Interface transaction.

8. The method of claim 1, wherein the connection protocol is transmission control protocol (TCP).

9. The method of claim 1, further comprising: establishing data representing a setting associated with the memory region, wherein the setting indicates that the memory region is configured to be valid for a single access by a remote node, such that the memory region will be invalidated in response to the memory region being accessed in fulfillment of a valid, incoming remote operation.

10. A method comprising:
    placing a work request on a send queue in an Internet protocol suite offload engine, wherein the work request contains an identification of a memory region to be registered with the Internet protocol suite offload engine, wherein the Internet protocol suite offload engine is embodied in hardware coupled to the host, wherein the hardware maintains sequence numbers and acknowledges all frame transfers, and wherein paths used by the work request and a corresponding positive acknowledgement of the work request are asymmetric;
    generating a tag associated with the memory region;
    receiving from the Internet protocol suite offload engine the tag associated with the memory region as registered;
    in response to registering the memory region, returning the tag to the host wherein the tams associated with the memory regions;
    performing an input/output transaction over a connection protocol in a network with a remote node using the tag to refer to the memory region, wherein in the input/output transaction data is transferred using direct access to the memory region;

wherein the memory region is registered in response to processing a combined register memory region and send work request associated with a transaction in an upper level protocol and the method further includes:

receiving an incoming transaction send message in the upper level protocol, wherein the transaction send message includes a request to deregister a tag associated with the memory region; and in response to receiving the send message, deregistering the memory region associated with the tag.

11. A method comprising:

registering a memory region in an Internet protocol suite offload engine for transactional use with respect to a remote node, wherein the Internet protocol suite offload engine is embodied in hardware coupled to the host, wherein the hardware maintains sequence numbers and acknowledges all frame transfers, and wherein paths used by a work request and a corresponding positive acknowledgement of the work request are asymmetric;

performing a single transaction with the remote node with respect to the memory region, wherein the single transaction comprises the work request;

in response to performing the single transaction, deregistering the memory region;

generating a tag associated with the memory region;

in response to registering the memory region, returning the tag to the host wherein the tag is associated with the memory region;

performing an input/output transaction over a connection protocol in a network with a remote node using the tag to refer to the memory region wherein in the input/output transaction data is transferred using direct access to the memory region;

wherein the memory region is registered in response to processing a combined register memory region and send work request associated with a transaction in an upper level protocol and the method further includes:

receiving an incoming transaction send message in the upper level protocol wherein the transaction send message includes a request to deregister a tag associated with the memory region; and in response to receiving the send message deregistering the memory region associated with the tag.

12. A computer program product in at least one computer-readable media include recordable-type media comprising functional descriptive material that, when executed by a computer, enables the computer to perform acts including:

receiving a work request in an Internet protocol suite offload engine from a host, wherein the Internet protocol suite offload engine is embodied in hardware coupled to the host;

in response to receiving the work request, registering in a translation table a memory region associated with the host, wherein the hardware maintains sequence numbers and acknowledges all frame transfers, and wherein paths used by the work request and a corresponding positive acknowledgement of the work request are asymmetric;

translating, in the Internet protocol suite offload engine, a virtual address to a physical address associated with the memory region;

validating, in the Internet protocol suite offload engine, the virtual address;

accessing data associated with the virtual address;

generating a tag associated with the memory region;

in response to registering the memory region, returning the tag to the host, wherein the tag associated with the memory region:

performing an input/output transaction over a connection protocol in a network with a remote node using he tag to refer to the memory region, wherein in the input/output transaction data is transferred using direct access to the memory region;

wherein the memory region is registered in response to processing a combined register memory region and send work request associated with a transaction in an upper level protocol and the method further includes:

receiving an incoming transaction send message in the upper level protocol wherein the transaction send message includes a request to deregister a tag associated with the memory region; and in response to receiving the send message, deregistering the memory region associated with the tag.

13. The computer program product of claim 12, wherein the work request includes memory protection information associated with the memory region and the computer program product includes additional functional descriptive material that, when executed by the computer, enables the computer to perform additional acts including: storing the memory protection information in the translation table.

14. The computer program product of claim 12, wherein the work request is received through a send queue.

15. The computer program product of claim 12, wherein the tag includes an index into the translation table.

16. The computer program product of claim 12, comprising additional functional descriptive material that, when executed by the computer, enables the computer to perform additional acts including: in response to registering the memory region, placing a completion queue element on a completion queue.

17. The computer program product of claim 12, wherein the work request includes an Internet Small Computer Systems Interface command.

18. The computer program product of claim 17, wherein the memory region is registered in response to processing an Internet Small Computer Systems Interface command and the computer program product includes additional functional descriptive material that, when executed by the computer, enables the computer to perform additional acts including:

performing a transaction in fulfillment of the Internet Small Computer Systems Interlace command;

receiving an Internet Small Computer Systems Interface response associated with the transaction; and in response to receiving the Internet Small Computer Systems Interface response, deregistering the memory region.

19. The computer program product of claim 12, comprising additional functional descriptive material that, when executed by the computer, enables the computer to perform additional acts including: establishing data representing a setting associated with the memory region, wherein the setting indicates that the memory region is configured to be valid for a single access by a remote node, such that the memory region will be invalidated in response to the memory region being accessed in fulfillment of a valid, incoming remote operation.

20. The computer program product of claim 12, wherein the memory region is registered in response to processing a combined register memory region and send work request associated with a transaction in an upper level protocol, and the computer program product includes additional functional descriptive material that, when executed by the computer, enables the computer to perform additional acts including:

receiving an incoming transaction send message in the upper level protocol, wherein the transaction send message includes a request to deregister a tag associated with the memory region; and in response to receiving the send message, deregistering the memory region associated with the tag.

21. A computer program product in at least one computer-readable medium include recordable-type media comprising functional descriptive material that, when executed by a computer, enables the computer to perform acts including:

placing a work request on a send queue in an Internet protocol suite off load engine, wherein the work request contains an identification of a memory region to be registered with the Internet protocol suite offload engine, wherein the Internet protocol suite offload engine is embodied in hardware coupled to the host, wherein the hardware maintains sequence numbers and acknowledges all frame transfers, and wherein paths used by the work request and a corresponding positive acknowledgement of the work request are asymmetric;

generating a tag associated with the memory region;

receiving from the Internet protocol suite offload engine the tag associated with the memory region as registered;

in response to registering the memory region, returning the tams to the host, wherein the tag is associated with the memory region;

performing an input/output transaction over a connection protocol in a network with a remote node using the tag to refer to the memory region, wherein in the input/output transaction data is transferred using direct access to the memory region;

wherein the memory region is registered in response to processing a combined register memory region and send work request associated with a transaction in an upper level protocol and the method further includes:

receiving an incoming transaction send message in the upper level protocol, wherein the transaction send message includes a request to deregister a tag associated with the memory region; and in response to receiving the send message, deregistering the memory region associated with the tag.

22. A computer program product in at least one computer-readable medium include recordable-type media comprising functional descriptive material that, when executed by a computer, enables the computer to perform acts including:

registering a memory region in an Internet protocol suite offload engine for transactional use with respect to a remote node, wherein the Internet protocol suite offload engine is embodied in hardware coupled to the host, wherein the hardware maintains sequence numbers and acknowledges all frame transfers, and wherein paths used by the work request and a corresponding positive acknowledgement of the work request are asymmetric;

performing a single transaction with the remote node with respect to the memory region, wherein the single transaction comprises the work request;

in response to performing the single transaction, deregistering the memory region request are asymmetric;

generating a tag associated with the memory region;

in response to registering the memory region returning the tag, to the host wherein the tag is associated with the memory region;

performing an input/output transaction over a connection protocol in a network with a remote node using the tag to refer to the memory region wherein in the input/output transaction data is transferred using direct access to the memory region;

wherein the memory region is registered in response to processing a combined register memory region and send work request associated with a transaction in an upper level protocol and the method further includes:

receiving an incoming transaction send message in the upper level protocol wherein the transaction send message includes a request to deregister a tag associated with the memory region; and in response to receiving the send message, deregistering the memory region associated with the tag.

23. A host data processing system comprising:

means for placing a work request on a send queue in an Internet protocol suite offload engine associated with the host, wherein the work request contains an identification of a memory region to be registered with the Internet protocol suite offload engine, wherein the Internet protocol suite offload engine is embodied in hardware coupled to the host, wherein the hardware maintains sequence numbers and acknowledges all frame transfers, and wherein paths used by the work request and a corresponding positive acknowledgement of the work request are asymmetric;

means for receiving from the Internet protocol suite offload engine a tag associated with the memory region as registered;

request are asymmetric;

means for generating a tag associated with the memory region;

means for, in response to registering the memory region returning the tag to the host, wherein the tag is associated with the memory region;

means for performing an input/output transaction over a connection protocol in a network with a remote node using the tag to refer to the memory region wherein in the input/output transaction data is transferred using direct access to the memory region;

wherein the memory region is registered in response to processing a combined register memory region and send work request associated with a transaction in an upper level protocol and the host data processing system further includes:

means for receiving an incoming transaction send message in the upper level protocol, wherein the transaction send message includes a request to deregister a tag-associated with the memory region; and means for, in response to receiving the send message deregistering the memory region associated with the tag.

24. The Internet protocol suite offload engine of claim 23, wherein the tag includes an index into the translation table.

* * * * *